(12) United States Patent
Jamadar et al.

(10) Patent No.: US 11,735,707 B2
(45) Date of Patent: Aug. 22, 2023

(54) METHOD FOR PROCESSING AN ELECTRODE SHEET AND PROCESSING DEVICE FOR THIS PURPOSE

(71) Applicant: VOLKSWAGEN AKTIENGESELLSCHAFT, Wolfsburg (DE)

(72) Inventors: Kartik Jamadar, Wolfsburg (DE); Christian Theuerkauf, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 17/198,890

(22) Filed: Mar. 11, 2021

(65) Prior Publication Data

US 2021/0288302 A1   Sep. 16, 2021

(30) Foreign Application Priority Data

Mar. 11, 2020 (DE) .................... 10 2020 203 092.8
Nov. 10, 2020 (DE) .................... 10 2020 214 087.1

(51) Int. Cl.
*H01M 4/04* (2006.01)
*H01M 4/139* (2010.01)
*H01M 10/0525* (2010.01)

(52) U.S. Cl.
CPC ......... *H01M 4/0435* (2013.01); *H01M 4/139* (2013.01); *H01M 10/0525* (2013.01)

(58) Field of Classification Search
CPC .. H01M 4/0435; H01M 4/139; H01M 4/0404; H01M 10/0525; Y02E 60/10;
(Continued)

(56) References Cited

U.S. PATENT DOCUMENTS 6,280,879 B1   8/2001  Andersen et al.
6,667,000 B1 * 12/2003  Nakazato .............. H01M 4/622
                                                         264/104
(Continued)

FOREIGN PATENT DOCUMENTS

CN          105314432 A      2/2016
DE    10 2011 088 824 A1    6/2013
(Continued)

OTHER PUBLICATIONS

JP-2019186172-A, machine translation, originally published 2019, p. 1-35 (Year: 2019).*

(Continued)

*Primary Examiner* — Katherine A Bareford
*Assistant Examiner* — Christina D McClure
(74) *Attorney, Agent, or Firm* — Pearl Cohen Zedek Latzer Baratz LLP

(57) ABSTRACT

A method for processing an electrode sheet, wherein the electrode sheet has a carrier layer and an electrode material that is applied to the carrier layer only in a material region of the electrode sheet, so that a free region, which is free of electrode material, remains for the formation of diverters, wherein the electrode sheet is guided in a conveying direction by a processing device, so that the material region and the free region (run side by side, wherein the processing device has a calender through which the electrode sheet is guided and with which the material region is calendered, wherein the processing device additionally has at least one roller that is designed in such a way that it exerts a transverse tensile stress on the electrode sheet. A corresponding processing device is also specified.

13 Claims, 14 Drawing Sheets

(58) Field of Classification Search
CPC .... B65H 20/02; B65H 23/26; B65H 35/0086; B65H 2701/10
See application file for complete search history.

(56) References Cited

U.S. PATENT DOCUMENTS

| | | | |
|---|---|---|---|
| 2016/0036085 | A1 | 2/2016 | Kyungtaek et al. |
| 2018/0226630 | A1* | 8/2018 | Yanai ........................ B30B 3/00 |

FOREIGN PATENT DOCUMENTS

| | | | |
|---|---|---|---|
| DE | 10 2012 005 229 A1 | 9/2013 | |
| DE | 10 2013 207 353 A1 | 10/2014 | |
| DE | 10 2017 218 137 A1 | 4/2019 | |
| EP | 0 876 683 | 11/1998 | |
| JP | H09-219189 A | 8/1997 | |
| JP | 2013-235673 A | 11/2013 | |
| JP | 2014-120273 A | 6/2014 | |
| JP | 2015044137 A * | 3/2015 | |
| JP | 2019-186172 A | 10/2019 | |
| JP | 2019186172 A * | 10/2019 | |
| WO | WO 2019/174844 A1 | 9/2019 | |

OTHER PUBLICATIONS

JP-2015044137-A, machine translation, originally published 2015, p. 1-21 (Year: 2015).*
JP 2014120273-A, machine translation, originally published 2014, p. 1-26 (Year: 2014).*
JP 2013235673-A, machine translation originally published 2013, p. 1-27 (Year: 2013).*
Search report for German Patent Application No. 10 2020 203 092.8, dated Oct. 28, 2020.
Search report for European Patent Application No. EP 21 15 7728, dated Jul. 16, 2021.
Office Action for Chinese Patent Application No. 202110266219.6, dated Nov. 3, 2022.

* cited by examiner

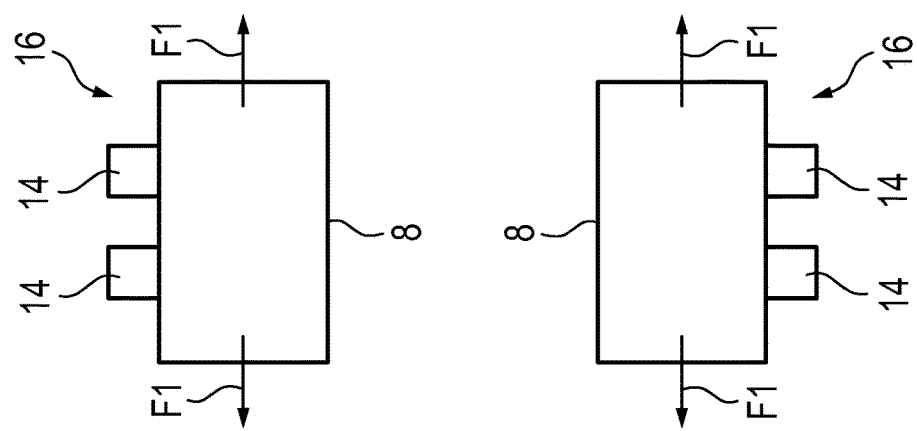
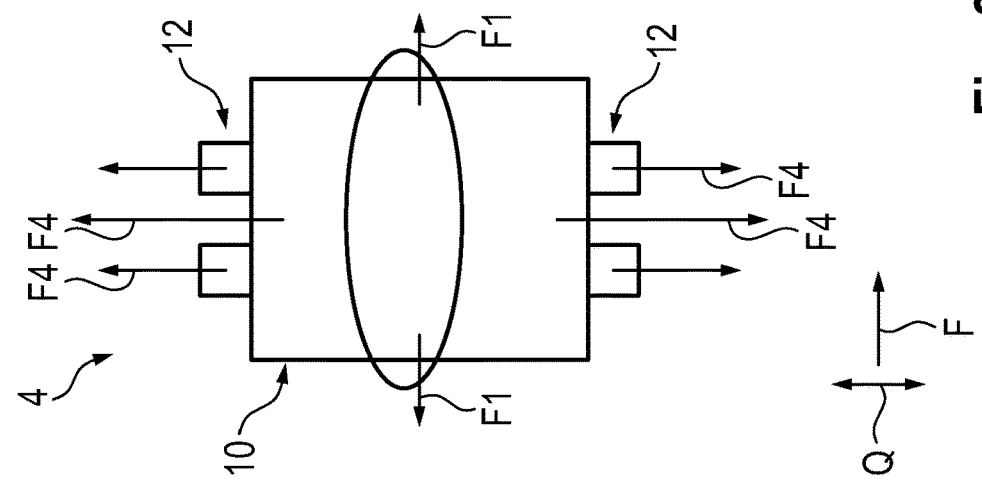
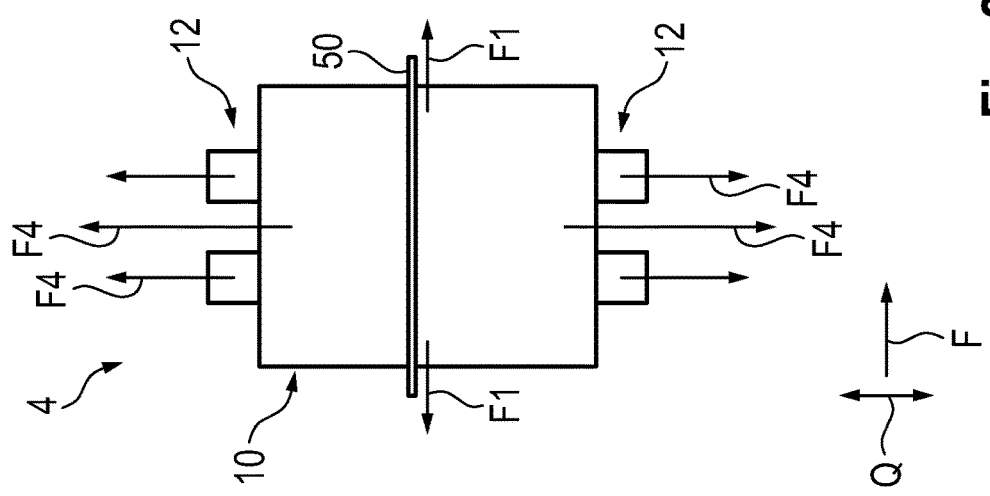

METHOD FOR PROCESSING AN ELECTRODE SHEET AND PROCESSING DEVICE FOR THIS PURPOSE

CROSS-REFERENCE TO RELATED APPLICATIONS

This application claims priority from German Patent Application No. 10 2020 203 092.8, filed Mar. 11, 2020, and from German Patent Application No. 10 2020 214 087.1, filed Nov. 10, 2020, which are hereby incorporated by reference in their entireties.

FIELD OF THE INVENTION

The invention relates to a method for processing an electrode sheet and a processing device suitable for this purpose.

BACKGROUND OF THE INVENTION

An electrode sheet is used to manufacture a battery, i.e., to manufacture an electrochemical energy store. The battery is, for example, a Li-ion battery, which is used as an electrical energy store in an electric or a hybrid vehicle to supply an electric drive train of the same vehicle.

The electrode sheet serves as a starting point for producing electrodes for the battery. The electrode sheet is designed accordingly for the production of anodes or cathodes and consists of appropriate materials depending on the type of electrode. An electrode sheet generally has a carrier layer made of, for example, copper in the case of an anode and aluminum in the case of a cathode. An electrode material, for example a mixture with lithium as active material in the case of a cathode and a mixture with graphite as active material in the case of an anode, is applied to one or both sides of the carrier layer. Typically, other materials such as binders, solvents, carbon black or other additives are added to the relevant mixture.

The combination of carrier layer and electrode material results in an electrode sheet from which a plurality of electrodes are subsequently produced. A single electrode sheet is provided, for example, rolled up as a roll, unwound via an unwinder and fed to a processing device for further processing.

DE WO 2019/174844 A1 describes a method for producing an electrode foil. An electrode foil is calendered by means of two calenders, and then a part of a diverter foil of the electrode foil is cut off by means of a laser beam.

DE 10 2017 218 137 A1 describes a method for producing an electrode arrangement.

DE 10 2012 005 229 A1 describes a method for producing a battery cell.

SUMMARY OF THE INVENTION

Against this background, it is an object of the invention to improve the processing of an electrode sheet. A corresponding method and a corresponding processing device should be specified for this purpose.

The object is achieved according to the invention by a method having the features and by a processing device as in the independent claims. Advantageous embodiments, further developments and variants are the subject of the dependent claims. The statements in connection with the method also apply mutatis mutandis to the processing device and vice versa. Inasmuch as method steps of the method are described below, advantageous embodiments for the processing device result in particular from the fact that it is designed to carry out one or more of these method steps. Inasmuch as individual parts, especially rollers, are described below, they are preferably parts of the processing device.

The method is used to process an electrode sheet, in particular an electrode sheet for a battery. The electrode sheet is also referred to as an electrode foil. The electrode sheet has a carrier layer and an electrode material which is applied to the carrier layer only in a material region of the electrode sheet, so that a free region, which is free of electrode material, remains for the formation of diverters. The electrode sheet serves as a semi-finished product and as a starting point for the production of individual electrodes, for example for a prismatic cell, a round cell or a pouch cell. In this respect, the method is used in particular in the manufacture of electrodes. In the finished electrode, the diverters are used to make contact, for example, with a line or with other electrodes. The material region is also referred to as the active region, because it has the electrochemically active electrode material. The free region is also referred to as the diverter region, because it is used to form the diverters for contacting and for conducting current from or to the electrode. The electrode sheet is also generally referred to as continuous goods, because the electrode sheet is typically significantly longer than it is wide and can be rolled up and unrolled. A rolled-up electrode sheet forms a roll which can be supplied to a roll-to-roll method in a simple manner.

As part of the method, the electrode sheet is guided in a conveying direction through a processing device so that the material region and the free region run alongside one another. The processing device is also referred to as a processing machine or a processing system. In a suitable embodiment, the processing device is a roll-to-toll device and the method, in particular, is a roll-to-roll method. The electrode sheet is preferably unrolled by an unwinder of the processing device or, alternatively, already passed on to the processing device as an unrolled sheet, for example from a device connected upstream along a production line. The conveying direction corresponds to a longitudinal direction of the electrode sheet. A transverse direction runs transversely, i.e., in particular perpendicularly, to the longitudinal direction. The electrode sheet lies in a plane which is spanned by the longitudinal direction and the transverse direction. When passing through the processing device during the method, the electrode foil is possibly deflected one or more times, so that the plane and the conveying direction are also deflected accordingly. The material region and the free region are formed alongside one another in the longitudinal direction and accordingly run alongside one another in the conveying direction. The free region and the material region in particular directly adjoin one another, that is to say the free region begins directly where the electrode material ends on the carrier layer and forms an edge. The free region is characterized in particular by the fact that it is thinner than the material region, because the additional electrode material is applied on said material region.

Measured in the longitudinal direction, the electrode sheet is, for example, several hundred meters long. The electrode sheet, measured perpendicular to the longitudinal direction, preferably has a width in the range from 10 cm to 150 cm. The free region, measured perpendicular to the longitudinal direction, preferably has a width which is between 5 mm and 50 mm. The material region takes up the remaining width. An embodiment is particularly preferred in which a single material region runs centrally between two lateral free regions, wherein the free regions preferably also form edge regions of the electrode sheet. Alternatively, a plurality of material regions are alternately arranged perpendicular to the longitudinal direction with a plurality of free regions. Without restricting the generality, an electrode sheet with a material region is assumed below which is bordered on both sides by two free regions. The statements also apply analogously to other geometries.

The carrier layer is preferably made of a metal, particularly preferably aluminum or copper. The carrier layer preferably has a thickness in the range from 5 µm to 20 µm. In the free region, the thickness of the electrode sheet corresponds in particular to the thickness of the carrier layer, because no further materials are present here. In a suitable embodiment, the electrode material consists of a mixture with lithium or graphite as active material. The active material is selected in particular depending on the material of the carrier layer. One or more other materials are suitably added to the relevant mixture, for example binders, solvents, carbon black or other additives. Before being fed into the processing device, the electrode material is preferably applied with a thickness in the range from 50 µm to 200 µm. The electrode material is preferably applied to both sides of the carrier layer, so that the electrode sheet then has a thickness in the range of 105 µm to 420 µm in the material region. Alternatively, the electrode material is only applied to one side of the carrier layer, so that the electrode sheet in the material region then has a thickness in the range from 55 µm to 220 µm. A carrier layer coated on both sides with electrode material is assumed below, without restricting the generality. However, the statements also apply analogously to a carrier layer coated on only one side.

The processing device has a calender, which is a processing stage of the processing device. The electrode sheet is passed through the calender, and the material region is then calendered therewith. As a result, a force is exerted perpendicularly both to the longitudinal direction and to the transverse direction, that is to say perpendicular to the plane of the electrode sheet, by which force the electrode material is pressed and compressed. The electrode material is preferably compressed by 30% to 50%. By pressing and compression, the calender produces forces in particular in the plane, i.e., in the transverse direction and/or in the longitudinal direction, because they are the only remaining directions in which the electrode sheet can deflect.

The calender has at least two or more rollers, each of which is also referred to as a calender roller. A calender roller is characterized in that it is pressed against the electrode sheet as part of the method in order to thereby compress the electrode material. The electrode sheet is suitably passed through two calender rollers which are arranged at a distance from one another which is less than the thickness of the electrode sheet upstream of the calender. A relevant calender roller, especially its outer surface, which is in contact with the material region, is preferably harder than the electrode material and for this purpose is made of a hard material. A hard material is understood here and generally as a material with a hardness greater than 50 HRC (i.e., Rockwell hardness), preferably a metal, in particular steel, hardened steel or chrome steel, or a carbon fiber reinforced plastic or the like. An embodiment is also advantageous in which the roller is completely or partially coated with a hard material, preferably tungsten carbide. A multistage calender is also useful in which the electrode sheet is guided in succession in the conveying direction through a plurality of processing stages, each having in particular two calender rollers, for multi-stage compression.

In the present case, the processing device now has at least one roller in addition, i.e. in addition to the calender, which is designed such that it exerts an additional tensile stress, preferably at least one transverse tensile stress, on the electrode sheet. The electrode sheet is accordingly additionally processed by means of the additional roller, specifically seized in a targeted manner and drawn transversally, that is, drawn in the transverse direction. The roller produces a transverse tensile stress which acts transversely to the conveying direction and is introduced by the roller into the electrode sheet and especially into the carrier layer. Preferably the roller exerts a transverse tensile stress on the electrode sheet in order to prevent wrinkling, in particular wrinkling of the carrier layer. In other words: during the method, the roller exerts a transverse tensile stress on the electrode sheet, so that wrinkling is prevented. The formation of wrinkles occurs in particular during the method, potentially due to the calender or to another processing stage of the processing device.

In particular, the roller does not, or does not only, serve to convey the electrode sheet in the conveying direction. To convey the electrode foil through the processing device, it expediently has an unwinder and a winder for the electrode foil which exert a sheet tension on the electrode foil in the conveying direction.

The processing device preferably has a plurality of additional rollers for processing the carrier layer, wherein the rollers then are not necessarily of identical design. The roller is generally in particular cylindrical and extends along an axis of rotation about which the roller is in particular rotationally symmetrical. The roller is arranged either upstream or downstream of the calender in the conveying direction and is then part of a processing stage which is separate from this. Alternatively, the roller is arranged inside the calender, suitably in the conveying direction between two processing stages of a multi-stage calender. Alternatively, the roller is arranged within the calender perpendicular to the conveying direction next to a calender roller in such a way that the roller and the calender roller have a common axis of rotation, and then different longitudinal regions of the electrode sheet are processed differently at the same time. In particular, the additional roller is not a calender roller. The additional roller is preferably used primarily or exclusively to act on the carrier layer and not necessarily to process the electrode material, but, depending on the arrangement and functionality of the roller relative to the electrode sheet, said electrode material may also be processed by the roller.

A starting point of the invention is in particular the observation that during calendering of the electrode sheet there is a risk of wrinkles forming, which has negative effects on the quality of the electrode sheet. The formation of wrinkles is in particular dependent on the strength of a sheet tension during processing, which is created in the conveying direction in particular by an unwinder and a winder for the electrode sheet. With increasing sheet tension, the risk of wrinkles also increases. In addition, there is a risk of wrinkling, sometimes also due to the calender, which wrinkling produces corresponding forces in the transverse direction and/or in the longitudinal direction by pressing and compression perpendicular to the plane.

Wrinkling can be avoided, for example, by coating the carrier layer with electrode material only in portions in the conveying direction, so that an intermittently coated electrode sheet results, with free regions that extend transversely to the longitudinal direction in addition to further, lateral free regions that each form an outer edge. The entire electrode sheet is also referred to as the mother coil and, for example, is first cut longitudinally to remove the outer edges, thereafter calendered in a calender and then again cut longitudinally in the center, for example, in order to obtain a plurality of parallel partial sheets, each of which is also called a daughter coil. The relevant longitudinal cutting is also referred to as "slitting" and represents an additional cutting operation which is carried out as a processing stage using a slitter. Finally, a relevant partial sheet is then cut transversely and thereby parted into longitudinal portions in order to obtain individual electrodes. Calendering and slitting take place, for example, on two different systems and thus separately from one another in a plurality of processing stages in such a way that the electrode sheet is rolled up and unrolled again between two processing steps, which creates disadvantageous internal stresses in the material. During heating, for example in the course of calendering, these tensions are released, which usually leads to wrinkles. In the case of a continuously coated electrode sheet, the formation of wrinkles can be reduced by heating the electrode sheet in the calender and, in combination with the sheet tension in the longitudinal direction, any regions of the electrode sheet that are at risk of wrinkling are plastically deformed. However, the heating and plastic deformation described also result in a corresponding generation of heat and strain hardening, especially of the carrier layer, which can disadvantageously lead to increased oxidation and potentially worsen the weldability of the carrier layer.

In contrast to an intermittently coated electrode sheet, a continuously coated electrode sheet has a material region that is continuously formed in the longitudinal direction and thus electrode material that is continuously applied in the longitudinal direction. While in the case of an intermittently coated electrode sheet the diverters are formed in particular between two material regions that follow one another in the longitudinal direction, in the case of a continuously coated electrode sheet the diverters are formed to the side in the material region.

The problem of wrinkling during calendering will be explained in more detail below. The starting point is the fact that the electrode sheet has a different thickness when viewed transversely to the longitudinal direction, because the electrode material is only applied over a partial width. Two notional volume elements of the electrode sheet in the material region and in the free region are therefore subjected to different forces. In the free region, the sheet tension initially acts as a tensile stress in the longitudinal direction. A compressive stress of the calender acts perpendicular to the electrode sheet, i.e., perpendicular to both the longitudinal and the transverse direction, but only in the material region, because it is thicker. In the free region, therefore, no forces act perpendicular to the electrode sheet. The tensile stress in the longitudinal direction thus creates a compressive stress in the transverse direction, i.e. a negative elongation which draws the lateral free regions toward the center. In the material region, however, the situation is different. The sheet tension has the same effect here, but there is also the compressive stress in the calender, i.e., negative elongation, which typically predominates against the sheet tension, so that an additional positive elongation is produced in the transverse direction which drives the material region laterally outward. As a result, the lateral free regions are thus driven toward the material region and, conversely, the material region outward in the direction of the free regions, so that corresponding wrinkles are formed here which are in particular visible in the free regions. The regions of the electrode sheet of different thicknesses accordingly are subject to different transverse stresses, that is, forces in the transverse direction and transverse to the longitudinal direction. Analogously, due to the compressive stress, the calender may also produce an additional positive elongation in the longitudinal direction, which then drives the material region away from the calender along the longitudinal direction, that is to say forward and backward. This does not apply to the free regions, the result being that the material region is stretched in the longitudinal direction, but the free regions are not, so that corresponding wrinkles also form here, which in turn are in particular visible in the free regions. The regions of the electrode sheet of different thicknesses accordingly are subject to different longitudinal stresses, that is to say forces in the longitudinal direction and transversely to the transverse direction.

A further starting point of the invention is in particular the observation that calendering typically takes place more slowly than the slitting, usually at half the conveying speed. For example, the slitting takes place at a conveying speed of 100 m/min and the calendering at a speed of 50 m/min. This results in a correspondingly reduced utilization of the slitter.

Another starting point of the invention is in particular the observation that the electrode sheet in the slitter, i.e., during longitudinal cutting, is not tensioned in the longitudinal direction, so that no transverse stress is produced perpendicular to the conveying direction and the slitter therefore produces a disadvantageous tensile stress on the electrode sheet and a cutting edge having a disadvantageous burr.

The problem of the formation of burrs during slitting will also be explained in more detail below. In principle, it is possible to use a combination of two knives for slitting, namely an upper knife and a lower knife, which are arranged on opposite sides of the electrode sheet and each of which rotates and parts the electrode sheet like scissors in the longitudinal direction. Because the knives as a matter of principle scissor past each other, the material of the electrode sheet is first drawn between the two knives during the cutting, i.e., in the direction of a cutting edge of the one knife, so that wrinkles are created. In addition, tensile stress occurs in the region of the cutting edge, which leads to increased burr formation. There is also the risk that, as the knives wear and tear, the material of the electrode sheet will initially warp out of its plane up or down into a cutting gap before it is actually parted. The result is an uneven cut edge. Because of the scissoring action, there is also no resistance to this on the opposite side of a relevant knife, so that the electrode sheet accordingly deviates in this direction in an uncontrolled manner and forms a burr. The slitting is therefore very undefined overall and takes place in a very uncontrolled manner.

As already indicated above, the processing of an intermittently coated electrode sheet differs from the processing of a continuously coated electrode sheet. Without restricting the generality, a single mother coil is assumed for both cases which is parted into two daughter coils, but the statements also apply analogously to a single mother coil which is parted into more than two daughter coils. In the case of an intermittently coated electrode sheet, the carrier layer protruding in the transverse direction is suitably first cut off to the side of the successive material regions with a slitter, i.e., uncoated edge regions are cut off in the longitudinal direction. This prevents any wrinkling during the subsequent calendering in the calender. After calendering, the electrode sheet is then cut again longitudinally in a further slitter, this time in the center, in order to obtain two parallel partial sheets as daughter coils. A relevant daughter coil is then notched and parted into longitudinal portions in order to form individual electrodes. Corresponding diverters are also produced from the free regions between the material regions. After notching and parting, the individual electrodes are, for example, stacked. It is disadvantageous overall that the electrode sheet is cut longitudinally twice, once before and once after calendering, so that a total of at least three processing stages are necessary, namely first slitting, then calendering, then second slitting.

In the case of a continuously coated electrode sheet, the free regions for the formation of the diverters run to the side of the material region, which extends continuously along the longitudinal direction. The electrode sheet is fed to a calender and heated in the process. For example, the electrode sheet is preheated to 150° C. upstream of the calender, for example inductively or by means of an infrared heater, and the calender rollers have a temperature of 170° C. in order to further heat the electrode sheet accordingly as it is passed through. After the calender, the electrode sheet is cooled again, for example to room temperature. As a result of the heating, the material of the electrode sheet becomes softer and then plastically deformed due to the sheet tension. Any wrinkles are thereby advantageously drawn smooth and reduced accordingly. However, the already described oxidation of the carrier layer and the resulting reduced weldability of the diverters as well as a possible melting of any binder that may be present in the electrode material are problematic. The heating also makes the electrode sheet more ductile, loses strength and is then more difficult to cut. Furthermore, any warming represents a corresponding energy requirement. After calendering, the electrode sheet is fed to a slitter, which on the one hand shortens the lateral free regions to the width required for the diverter and on the other hand parts the material region in the center in order to produce two partial sheets as daughter coils. The final formation of the diverters then takes place in a subsequent, separate notching.

Based on the above considerations, the following disadvantages can be identified when processing an electrode sheet: long process times, complex handling of the electrode sheet, a large number of separate processing steps, risk of wrinkling during calendering and slitting, reduced cutting quality when slitting in previously uncompacted electrode material upstream of the calender, burr formation and formation of a fracture region and uncontrolled movement of material with wrinkles during slitting.

In the present case, one or more of the aforementioned disadvantages are now eliminated by the at least one additional roller. Various advantageous embodiments of the roller are described below. A combination of a plurality of these embodiments or all of them results in further advantageous embodiments.

First of all, the electrode sheet is preferably a continuously coated electrode sheet; by contrast an intermittently coated electrode sheet is not used. Furthermore, the electrode sheet is preferably coated in the same way on both sides and in this respect symmetrically with respect to the plane of the electrode sheet. The electrode sheet preferably has a material region running centrally in the longitudinal direction, with a left side and a right side. On both sides of the material region there is a free region which runs in the longitudinal direction and which serves to form diverters. This results in two lateral free regions which are at the same time edge regions of the electrode sheet. The free regions are also preferably formed continuously, i.e., uninterruptedly.

The additional roller rotates about an axis of rotation perpendicular to the conveying direction and is arranged on an upper side or a lower side of the electrode sheet, so that it is guided over an outer surface of the roller. In this case, the roller is suitably rotated about its axis of rotation in such a way that the outer surface rotates with the conveying direction and, so to speak, entrains the electrode sheet. The axes of rotation of all rollers of the processing device are preferably parallel to one another.

In the present case, the roller is designed in such a way that it exerts a transverse tensile stress on the electrode sheet and especially on the carrier layer in particular, advantageously in order to avoid wrinkling. The roller is therefore also referred to as a transverse draw roller. The transverse tensile stress counteracts in particular one or more of the above-described effects for the formation of wrinkles. The transverse tensile stress is a force which acts transversely, i.e., preferably perpendicularly, to the longitudinal direction and thus also to the conveying direction. The transverse tensile stress acts laterally outward and thus presses or pushes the carrier layer, starting from a center of the electrode sheet, in each case outward to the side. The electrode sheet and especially its carrier layer are advantageously stretched or tightened in the transverse direction by means of the roller and, so to speak, drawn smooth. The transverse tensile stress of the additional roller effectively prevents wrinkling during processing in the processing device, because the transverse tensile stress provides an additional parameter to modify the forces that act on the electrode sheet. The transverse tensile stress can be adjusted as required through the specific design of the transverse draw roller and adapted to the specific application. In particular, the transverse tensile stress, which is required to optimally avoid wrinkles, depends on the thickness of the electrode sheet in the material region and its compression in the calender, i.e., the compressive stress in the calender, but also on the sheet tension in the conveying direction.

In an expedient embodiment, the roller is designed in such a way that it engages the free region and exerts the transverse tensile stress within it. To this end, the roller has different transverse portions viewed in the transverse direction and along its axis of rotation, namely an outer portion which extends over the free region and an inner portion which extends over the material region. In the case of a central material region with two lateral free regions, the roller then accordingly has an inner portion which is laterally bordered by two outer portions. Alternatively, the roller has only one outer portion and does not extend in the transverse direction over the material region, but only over the free region and possibly outward beyond this. In the case of a plurality of free regions, the processing device preferably has a corresponding roller for each of the free regions, and these rollers have a common axis of rotation. The relevant outer portion engages the electrode sheet in the relevant free region and produces a transverse tensile stress here, whereas any inner portion which may be present exerts at most a compressive stress on the material region. This embodiment is in particular advantageous in order to compensate for a compressive stress in the calender, either inside the calender and as part thereof or outside the calender, in particular upstream thereof in the conveying direction.

In another useful embodiment, the roller is designed in such a way that it engages the material region and exerts the transverse tensile stress therein. For this purpose, the roller has two transverse portions, when viewed in the transverse direction and along its axis of rotation, namely a left-hand portion which, starting from the center of the material region, extends in the transverse direction to one side, and a right-hand portion, which accordingly extends from the center of the material region in the transverse direction to the other side. The two transverse portions now each exert a transverse tensile stress in mutually opposite directions, so that the material region is stretched, pushed or driven outward from the center on both sides. This embodiment is in particular advantageous in order to prevent the formation of burrs and wrinkles when the electrode sheet is simultaneously parted in the longitudinal direction and into a plurality of partial sheets.

The two aforementioned embodiments can also be combined in the processing machine, in particular by having two additional rollers, one of which acts on the free region as described and the other on the material region as described.

In order to exert the transverse tensile stress, the roller has, in a suitable embodiment, an outer surface which is made wholly or partially from a rubber, for example from a polyurethane. The roller is then designed in particular to produce the transverse tensile stress through friction. In the direction of rotation about the roller, the rubber is preferably continuous, that is to say without interruption. The term "rubber" is used here in particular to represent any material that is compressible and has a high level of friction, in particular friction which is greater than that of the hard materials already described above. The outer surface is expediently made of rubber only in the relevant free region, i.e., in particular along the relevant outer portion of a roller. The outer surface of rubber is produced, for example, in such a way that a corresponding rubber layer is applied to a base body of a roller made of an, in particular, hard material, for example by gluing on a rubber strip or by taking it about the roller. The rubber layer is in particular dependent on the thickness of the electrode material and is expediently thicker than the electrode material in order to allow a certain compression. In particular, the rubber can be compressed in such a way that it is compressed 100 µm to 500 µm, for example 300 µm, in the radial direction. For example, the rubber layer has a thickness in the range from 2 mm to 10 mm, for example 5 mm.

Alternatively or additionally, the roller is designed in a suitable embodiment such that it exerts a greater compressive stress on the free region than on the material region. In this way, too, the roller is then designed in particular to produce the transverse tensile stress by friction. For this purpose, the roller expediently has a larger diameter in the free region than in the material region, in particular by the relevant outer portion having a larger diameter than the inner portion. The difference between the diameter of the roller in the free region and in the material region is preferably greater than the thickness of the electrode material in the material region.

The two aforementioned embodiments are advantageously combined in such a way that the roller has a cylindrical base body which is sheathed with rubber, more precisely a rubber layer, along a relevant outer portion, so that here an outer surface is made of rubber, while the outer surface made of the material of the base body is formed along the inner portion. By sheathing with rubber, a relevant outer portion automatically also has a larger diameter than the inner portion, wherein the difference in these diameters corresponds to a thickness of the rubber layer.

Alternatively or in addition, the roller has a textured outer surface for exerting the transverse tensile stress in a suitable embodiment. The roller accordingly has a texture on the outside circumference, by means of which a transverse tensile stress is produced on the electrode sheet, especially its carrier layer. The texture is also known as a profile or structure. The textured outer surface has elevations or depressions or both, so that the friction of the roller is correspondingly increased at least in the region of the textured outer surface. The texture preferably includes a plurality of ribs and/or grooves which run parallel to one another and which each preferably run straight. The texture, i.e. the elevations and/or depressions such as ribs and/or grooves, are in particular set at an engagement angle relative to the conveying direction, so that a corresponding transverse tensile stress results when the roller rotates and engages the electrode sheet. The engagement angle is preferably set in such a way that the resulting transverse tensile stress generally compensates for the forces due to compressive stress in the calender and sheet tension in the processing device and thereby optimally prevents wrinkling. The engagement angle is in particular also dependent on the thickness of the electrode material and on the compression provided in the calender.

The engagement angle is suitably set in that a suitable roller is selected from a set of rollers with differently textured outer surfaces and is inserted into the processing device. Alternatively, only the rubber layer can be exchanged and, in order to set the engagement angle, only the rubber layer on the base body is exchanged, similar to a tire change. The engagement angle preferably corresponds to that angle at which the wrinkles run which would be produced if no additional transverse tensile stress were produced by means of the roller. The optimal engagement angle and thus the selection of the specific texture are therefore suitably determined by guiding an electrode sheet without transverse tensile stress through the processing device as part of a calibration and then measuring the angle of the wrinkles that arise relative to the conveying direction. The engagement angle is preferably in the range from 5° to 50, particularly preferably up to 15°. In particular, the texture is thus parallel to the wrinkles that would arise.

The texture is preferably a microstructure, that is to say any elevations and depressions such as, for example, ribs and grooves, have only small dimensions. In a suitable embodiment, the ribs and/or grooves of the textured outer surface have a height or depth between 50 µm and 1000 µm. In a suitable embodiment, the ribs and/or grooves of the textured outer surface have a width between 100 µm and 500 µm. In a suitable embodiment, the ribs and/or grooves of the textured outer surface have a length between 3000 µm and 5000 µm. The elevations and/or depressions have a geometry which does not necessarily have to be straight, but instead is expediently adapted to the geometry of the wrinkles and in particular corresponds to this.

Alternatively or additionally, the roller in an advantageous embodiment for exerting the transverse tensile stress is spiral, that is, volute, threadlike, helical or the like. The roller then has an outer surface with a rib, which runs helically about the roller, so that said roller is designed as a whole in a helical manner, wherein the rib then forms a thread, so to speak. An edge, a projection or the like are equivalent to a rib. In a suitable embodiment, the rib is per se similar to the ribs of the texture described above, but typically larger, and accordingly a single rib is already sufficient. As a result of the helical design, a conveying effect in the transverse direction is achieved, so to speak, by means of which the transverse tensile stress is then produced. The electrode sheet is accordingly driven in the transverse direction by the helical roller and is thus advantageously drawn smooth. The rib of the roller runs either counterclockwise or clockwise, depending on where the roller is arranged relative to the electrode sheet and in which direction an additional force is required to smooth or avoid wrinkles. If the roller engages the material region, the roller, in terms of the helical design, is preferably designed mirror-symmetrically with respect to a mirror plane, which is perpendicular to the transverse direction. In this way, the rib then runs counterclockwise on a first half of the roller and clockwise on a second half.

As already indicated, the calender may produce a longitudinal tension difference between the free region and the material region in the conveying direction. The longitudinal tension difference results from the fact that the compressive stress of the calender may produce an additional force in the longitudinal direction, i.e. an additional longitudinal tensile stress, which in particular adds to the sheet tension. Because this is not the case in the free region, there is a lower longitudinal tensile stress there than in the material region. The difference between these two longitudinal tensile stresses in the free region and material region is then the longitudinal tension difference. This longitudinal tension difference arises in the conveying direction and is, for example, up to 1%. The longitudinal tension difference is preferably compensated for by one of the rollers of the processing device in that this roller produces an additional longitudinal tensile stress, preferably in the free region, but a correspondingly negative longitudinal tensile stress in the material region is also possible and suitable. A corresponding roller is analogously referred to as a longitudinal tension roller. Where a transverse draw roller is mentioned above and below, the statements apply accordingly to a transverse draw roller and longitudinal tension roller.

In an expedient embodiment, the roller, which already exerts transverse tensile stress, is designed to exert longitudinal tensile stress in addition to this transverse tensile stress, so that the difference in stress in the conveying direction is compensated for. Accordingly, the processing device expediently has a roller which exerts both an additional transverse tensile stress and an additional longitudinal tensile stress in order to compensate for stress differences due to the calender and to avoid or reverse the formation of wrinkles.

The transverse tensile stress and the longitudinal tensile stress are also generally referred to as tensile stress.

In principle, the same concepts are suitable for exerting the additional longitudinal tensile stress as for exerting a transverse tensile stress, so that a correspondingly designed roller advantageously exerts both a transverse tensile stress and a longitudinal tensile stress on the electrode sheet. Correspondingly, the above statements apply accordingly to a roller that exerts additional longitudinal tensile stress. Correspondingly, in a suitable embodiment for exerting the longitudinal tensile stress, in particular in combination with the transverse tensile stress, the roller has an outer surface which is made entirely or partially from a rubber. The outer surface is expediently textured. The engagement angle described is preferably chosen such that a suitable longitudinal tensile stress is also produced by means of friction. Alternatively or in addition, a helical roller, as already described, is also suitable for exerting both a transverse tensile stress and a longitudinal tensile stress. The exact design, dimensioning and orientation of the roller and its possibly existing texture is selected in particular depending on whether this roller engages the material region or the free region.

As an alternative or in addition to the aforementioned concepts of exerting a longitudinal tensile stress by means of friction, the roller has, in a suitable embodiment, a drive, for example an electric motor, for exerting the longitudinal tensile stress. Such a drive is expediently used if it is not possible to compensate for the longitudinal tension difference by means of friction as described. The drive rotates the roller and thus produces a slip relative to the calender roller and a corresponding force on the electrode sheet in or against the conveying direction and thus ultimately an additional longitudinal tensile stress. If the roller is arranged inside the calender and next to a calender roller and has a common axis of rotation with this calender roller, the roller and the calender roller then have separate drives, so that the roller and the calender roller can be rotated at different speeds in order to compensate for the longitudinal tension difference.

The transverse draw roller is preferably a first transverse draw roller and is arranged above or below the electrode sheet, and the processing device has a second transverse draw roller which is arranged on the opposite side of the electrode sheet with respect to the first transverse draw roller, so that the two transverse draw rollers form a gap through which the electrode sheet is conveyed, so that its carrier layer is processed on both sides by means of a transverse draw roller. The two transverse draw rollers form a pair of rollers and are preferably designed in the same way with regard to the production of a transverse tensile stress, in particular having the same dimensions, the same textures, the same materials or a combination thereof. In this regard, the second transverse draw roller is preferably designed as a mirror image of the first transverse draw roller, wherein the electrode sheet forms a mirror plane. The two transverse draw rollers in particular have opposite directions of rotation. If the two rollers of the pair of rollers both have a textured outer surface, the corresponding elevations and/or depressions on both outer surfaces are expediently designed to be complementary to one another, so that an elevation is opposite a depression and vice versa, in particular such that the elevations and depressions intermesh.

In an advantageous embodiment, a separating tool is integrated into the or a further roller for processing the carrier layer in such a way that it is parted by means of the cutting tool. The integration of a parting by means of the cutting tool in the processing device in addition to the calender is particularly advantageous, because two functions are combined in a single processing device. The cutting tool is preferably a knife having a number of blades, wherein "a number of" is understood here and also generally to mean "one or more." The roller is then also referred to as a cutting roller. The roller cuts the electrode sheet and especially the carrier layer by means of the cutting tool, preferably according to the principle of rotary cutting. The cutting tool, especially its blades, is/are preferably made of tungsten carbide. If the processing is only carried out in the free region, it is also just the carrier layer that is parted. If the processing takes place in the material region, in addition to the carrier layer, the electrode material is also parted because of the principle involved. Correspondingly, when the transverse tensile stress and the cutting tool are combined, an embodiment is conceivable and suitable in which the cutting tool is integrated into a first roller and the transverse tensile stress is exerted by another, second roller.

By integrating a cutting tool into the processing device and in addition to calendering, a further function is integrated into the processing device. In general, the advantage of this integration is that the electrode sheet does not have to be rolled up and unrolled repeatedly for different processing stations, but is guided, so to speak, continuously and without interruption through a plurality of processing stations. Calendering and parting are done with a single processing device. The integration of a cutting tool is in itself independent of the exertion of transverse tensile stress but benefits therefrom. Therefore, an embodiment in which the processing device has a roller in which a cutting tool is integrated, by means of which the electrode sheet is parted, in particular along the longitudinal direction, even without the feature that the processing device additionally has at least one roller which is designed in such a way that it exerts a transverse tensile stress on the electrode sheet, is considered to be inventive. Such a processing device already has the advantage of increased integration, regardless of the avoidance of wrinkling.

In a suitable embodiment, the carrier layer in the free region is parted by means of the separating tool in such a way that recurring diverters are formed. First longitudinal portions of the free region are repeatedly cut out by means of the cutting tool, so that gaps are created, between which second longitudinal portions of the free region are left remaining as diverters. As a result, the electrode sheet is notched in particular so that subsequent notching is no longer necessary. This expediently results in a side edge in the form of a rectangular signal. Accordingly, the cutting tool expediently has a number of longitudinal blades which cut in the longitudinal direction and a number of transverse blades which cut in the transverse direction. The longitudinal blades are arranged alternately inside and outside in the direction of rotation of the roller in order to separate or leave longitudinal portions. A transverse blade is arranged in the direction of rotation between two longitudinal blades in order to separate successive longitudinal portions of the free region from one another.

Alternatively or additionally, the electrode sheet is parted in the material region and along the conveying direction by means of the cutting tool or another cutting tool in such a way that a plurality of partial sheets are formed which run alongside one another. The electrode sheet is preferably parted in the center. The partial sheets are also called daughter coils. For example, at least one left and one right partial sheet are produced. For this purpose, the cutting tool expediently has a number of blades which are arranged along a common circumferential line about the roller and one behind the other in the direction of rotation, so that a straight cut is produced in the conveying direction.

The cutting tool for producing the partial sheets is either integrated together with the cutting tool for forming the diverter into a single roller, or the two cutting tools are distributed over two different rollers, so that a first cutting tool is integrated into a first roller, by means of which the carrier layer is parted in the free region in such a way that recurring diverters are formed, and a second cutting tool is integrated into a second roller, by means of which the electrode sheet is parted in the material region and along the conveying direction in such a way that a plurality of partial sheets are formed which run alongside one another.

The cutting tool preferably has an adjustable cutting depth in that the blades can be moved into or out of the roller. In a suitable embodiment, the blades of the cutting tool are resiliently connected to one another for this purpose, namely suitably in such a way that two blades which are adjacent in the direction of rotation of the roller are joined by means of a spring. In an advantageous embodiment, an adjusting screw on which an adjustment cone is slidably mounted in the transverse direction runs along the axis of rotation. The adjustment cone presses from the inside and in the radial direction, i.e. perpendicular to the axis of rotation, outward against the blades, which are mounted against an outer surface of the adjustment cone. This produces an adjustment mechanism in which, by turning the adjusting screw, the adjustment cone is moved in the transverse direction through the roller and, depending on the direction of rotation of the adjusting screw, then drives the blades further out of the roller in the radial direction or lets them retract into the roller by the springs, so that, as a result, the cutting depth is adjustable.

An embodiment is particularly advantageous in which the roller is designed at the same time as a transverse draw roller and as a cutting roller, wherein the cutting tool is then integrated into a transverse portion of the roller which produces the transverse tensile stress. In this way, an advantageous transverse tensile stress is automatically exerted during the relevant parting by means of the cutting tool, thereby reducing the formation of burrs and also wrinkling during the parting. Particularly in combination with an outer surface made of rubber, there is an advantageous embodiment in which the rubber is initially compressed when it comes into contact with the electrode sheet, thereby releasing the blades of the cutting tool, which then part the electrode sheet under optimal transverse tensile stress. The depth of cut and the thickness of the rubber are expediently matched to the thickness of the carrier layer and the electrode material. The outer surface is correspondingly compressible, so that the cutting tool is automatically released with a suitable cutting depth when the outer surface is compressed.

Also in the embodiment as a cutting roller, the roller on the opposite side of the electrode sheet is expediently assigned a counter roller which then forms a roller pair with the roller. The cutting roller is arranged above or below the electrode sheet and the processing device has a counter roller which is arranged on the opposite side of the electrode sheet with respect to the cutting roller, so that the two rollers form a gap through which the electrode sheet is conveyed. The carrier layer thereof is processed by means of the cutting roller, wherein an outer surface of the counter roller forming a counter-contour for the cutting tool. The cutting tool therefore rolls over the counter roller, so to speak. This results in wedge cutting, which has the advantage of reduced burr formation and wrinkling compared to shear cutting using two opposing knives. The counter roller or at least its outer surface is preferably made of a hard material. The outer surface of the cutting roller, on the other hand, is not necessarily made from a similar or the same material, but preferably from a rubber, as already described above.

An embodiment is particularly useful in which the counter roller is a calender roller of the calender, so that the cutting roller is arranged inside the calender and there parts the electrode sheet. This eliminates the need for a separate counter roller, and a calender roller is typically already made of a suitable material for use as a counter roller. Because the cutting roller presses heavily on the counter roller in the region of the cutting tool, there is a potential risk of the counter roller bending, which is particularly disadvantageous in the calender. Therefore, in an advantageous embodiment, an additional support roller is arranged on a side of the counter roller opposite the cutting roller, so that the cutting roller and the support roller press on the mating roller from opposite sides and the one-sided force is canceled by the cutting roller. This is particularly advantageous in the calender. The support roller is suitably made of a hard material.

In a preferred embodiment, the calender is designed in two stages and has three calender rollers, of which one calender roller serves as a counter roller for the other two calender rollers and is therefore advantageously used for dual purposes. The counter roller is preferably arranged between the two other calender rollers so that they are arranged on opposite sides of the calender roller. The electrode sheet then goes through two processing stages in the calender for compression, so that the electrode material is compressed twice. If a cutting roller is integrated into the calender, the calender roller, which is a counter roller for the other calender rollers, expediently also forms a counter roller for the cutting roller, so that a particularly compact arrangement results.

In a preferred embodiment, the processing device has a sheet feed for supplying the electrode sheet and a sheet take-up for receiving the processed electrode sheet. The sheet feed preferably has an unwinder which unwinds the electrode sheet and outputs it in the conveying direction. The sheet feed expediently also has a counter roller which is arranged on the opposite side of the electrode sheet with respect to the unwinder and which presses the electrode sheet against the unwinder so that the electrode sheet undergoes a normal compressive stress at which the electrode material in particular is not compressed. Similarly, the sheet take-up preferably has a winder which takes up the electrode sheet or its partial sheets in the conveying direction and winds them up. Appropriately, the sheet take-up also has a counter roller, which is arranged on the opposite side of the electrode sheet with respect to the winder and which presses the relevant partial sheet against the winder, so that here too the electrode sheet, more precisely the relevant partial sheet, is subjected to a normal compressive stress, at which the electrode material in particular is not compacted. The winder and the unwinder produce a sheet tension in the conveying direction and thus in the longitudinal direction of the electrode sheet.

Between the sheet feed and the sheet take-up, the processing device has a plurality of processing stages, of which at least one is formed by the calender and at least one further one by the at least one additional roller. The various embodiments of the additional roller described above are now implemented by one or more processing stages along the conveying direction. In principle, a large number of combinations of the concepts mentioned are possible. Four advantageous processing stages of the processing device are now described below, by means of which a method step of the method is carried out in each case. The described combination of the four processing stages with one another and their relative position to each other represent a preferred embodiment, but are not mandatory in this form per se, so that further advantageous embodiments can be achieved by omitting or adding one or more processing stages as well as through other combinations and/or relative positions of the processing stages to each other.

The processing device preferably has a first processing stage—especially downstream of the sheet feed in the conveying direction—with a roller which is designed in such a way that it engages the free region and therein exerts the transverse tensile stress and, depending on the configuration, also a longitudinal tensile stress and at the same time forms diverters recurrently in the free region. The roller is thus both a transverse draw roller and a cutting roller as already described, in particular with an inner portion for the material region and two lateral outer portions for exerting a transverse tensile stress in the lateral free regions. On the opposite side of the electrode sheet, a further roller is expediently arranged as counter roller, which on the one hand is also a transverse draw roller and on the other hand a counter roller for the cutting tool of the cutting roller. The processing stage is thus overall of a pair of rollers through which the electrode sheet is passed.

The first processing stage implements a first method step in which the electrode sheet is notched, i.e., in which lateral diverters are formed, and in particular without wrinkles. Accordingly, diverters are repeatedly cut from the relevant free region under the influence of transverse tensile stress on the one hand and sheet tension, possibly in combination with longitudinal tensile stress, on the other. The cutting tool in the cutting roller is set in such a way that the carrier layer is parted. The transverse draw rollers produce enough transverse tensile stress that wrinkles are smoothed out or do not appear at all. At the same time, due to the transverse tensile stress, the waste that occurs during the parting in the free region is carried away to the side, for example into a chute. The counter roller expediently has an outer surface made of hard material opposite the cutting tool of the cutting roller. There is no lower knife.

The processing device preferably has a second processing stage, which has two calender rollers of the calender on opposite sides of the electrode foil, for compressing the electrode material. The additional roller is designed as a transverse draw roller or as a transverse draw and longitudinal tension roller and is arranged to the side of one of the calender rollers and has a common axis of rotation therewith. The calender roller only acts on the material region and the additional roller only acts on the free region. The processing device preferably has not only one additional roller, but another three and thus four rollers taken together in such a way that each of the two calender rollers is bordered on both sides in the transverse direction by two of the four rollers, i.e. by two transverse draw rollers, and has a common axis of rotation therewith. The four rollers each only act in a free region and exert a transverse tensile stress there and, in an advantageous embodiment, also an additional longitudinal tensile stress. The relevant calender roller is preferably only as wide as the material region, so that the additional rollers only act on the free region. The second processing stage preferably follows the first processing stage, so that the calendering takes place after the notching and the transverse draw rollers of the second processing stage act on the diverters that have already been formed. Also the second processing stage is thus overall a pair of rollers through which the electrode sheet is passed.

The second processing stage realizes a second method step in which the electrode sheet is calendered, wherein the electrode material is compressed without wrinkles under the influence of transverse tensile stress on the one hand and sheet tension on the other hand. A transverse tensile stress and possibly an additional longitudinal tensile stress is only produced laterally in the free region by the lateral transverse draw rollers, while the electrode material is calendered in the center by the calender rollers.

The processing device preferably has a third processing stage with the or a further roller, in which—in particular as already described—a cutting tool is integrated for processing the carrier layer in such a way that it is parted by means of the cutting tool. At the same time, this roller is designed in such a way that it engages the material region and exerts the transverse tensile stress therein. The roller is accordingly a transverse draw roller, which is at the same time a cutting roller, namely, more precisely, a slitter for producing partial sheets. In an expedient development, the roller is also a longitudinal tension roller and, as described, produces an additional longitudinal tensile stress. On the opposite side of the electrode sheet, a further roller is expediently arranged as a counter roller, which on the one hand is also a transverse draw roller and on the other hand a counter roller for the cutting tool of the cutting roller. One of the calender rollers of the second processing stage is preferably used as the counter roller. As already described, a support roller is then expediently also present opposite the cutting roller. The third processing stage suitably follows the second processing stage.

The third processing stage realizes a third method step in which the electrode sheet is slit, i.e., in which a plurality of partial sheets are formed by a central longitudinal cut in particular, and this is in particular burr-free and wrinkle-free. The electrode sheet is accordingly parted into a plurality of partial sheets under the influence of transverse tensile stress on the one hand and sheet tension on the other. In contrast to the calender rollers, the transverse draw roller only produces normal compressive stress, so that the electrode material is initially not further compressed when slitting. However, this compressive stress reduces or completely prevents the formation of burrs during the parting. As a result of the transverse tensile stress, the electrode material and the carrier layer are influenced to a particularly small degree by the immersion of the cutting tool during the parting and in particular are not drawn into a cutting gap in an uncontrolled manner. Wrinkling and a resulting wave profile are avoided.

The processing device preferably has a fourth processing stage, which, like the second processing stage, in turn has two calender rollers of the calender on opposite sides of the electrode foil for re-compressing the electrode material. The second and fourth processing stages thus form the calender as a two-stage calender for which advantageous embodiments result as already described above. The statements on the second processing stage apply in particular to the fourth processing stage. Analogously to the second processing stage, in the fourth processing stage, four additional rollers are preferably designed as transverse draw rollers and, if necessary, also as longitudinal tension rollers and are arranged to the side of a relevant calender roller, so that a relevant calender roller is bordered on both sides in the transverse direction by two transverse draw rollers and has a common axis of rotation with them. The calender roller is only as wide as the material region, so that the transverse draw rollers only act on the free region. The fourth processing stage preferably follows the third processing stage, so that after the parting, in particular slitting, the electrode material of the partial sheets is compacted further. In addition, the cut edges produced during slitting are calendered so that any burrs are compressed and straightened, preferably below a height of 50 μm.

The fourth processing stage realizes a fourth method step in which the partial sheets are calendered and any burrs from the third processing stage are squashed. This, too, takes place under the influence of transverse tensile stress on the one hand and sheet tension, possibly in combination with longitudinal tensile stress, on the other hand, so that again compression is wrinkle-free. Analogous to the second processing stage, a transverse tensile stress and, depending on the embodiment, an additional longitudinal tensile stress is only produced laterally in the free region by the lateral transverse draw rollers, while the electrode material is calendered in the center by the calender rollers.

If rollers having a textured outer surface are used in the second, third and fourth processing stages, these possibly produce a structure or profile of the carrier layer and/or the electrode material. A pattern is thus impressed in the free region and/or in the material region by the textured outer surface. In the free region, this is typically not a problem, because the diverters are welded here during further processing of the electrodes. At least in the material region, the pattern possibly impressed by the third processing stage is expediently compensated for by means of the fourth processing stage, i.e., the electrode sheet and especially the electrode material is smoothed with the fourth processing stage. For this purpose, the calender roller of the fourth processing stage itself has a smooth outer surface in order to smooth the electrode material in the material region after it has possibly been structured or profiled in the third processing stage by a transverse draw roller having a textured outer surface. Irrespective of this, all of the other calender rollers also expediently each have a smooth outer surface. An embodiment is particularly useful in which the roller of the third processing stage, if it has a textured outer surface, has elevations on the outer surface, so that depressions are formed in the electrode material, which can then be smoothed particularly easily by the fourth processing stage.

The rollers described in connection with the four processing stages, apart from the calender rollers, are preferably designed independently, so that each processing stage has one or more separate rollers. Only one or more of the calender rollers are expediently used a plurality of times in multiple processing stages. However, embodiments are also possible and suitable in which the functions of a plurality of rollers of different processing stages are combined in a single roller.

A cleaning stage, which is also referred to as sheet cleaning, is expediently arranged upstream of the winder and downstream of the aforementioned processing stages. The partial sheets are cleaned in a fifth method step by means of the cleaning stage. For example, an electrostatic charge is applied to the electrode sheet and, as a result, correspondingly light particles such as loose electrode material are sucked in and removed. Downstream of the winder, the partial sheets are expediently separated into electrodes by parting of the partial sheets into suitably long longitudinal portions by means of a transverse cutting tool, which partial sheets then each represent an electrode with an associated diverter.

In summary, the electrode sheet is preferably processed in all four processing stations with the help of special transverse draw rollers and/or transverse draw rollers and longitudinal tension rollers under the influence of an additional transverse tensile stress and, if necessary, an additional longitudinal tensile stress, whereby overall wrinkling is efficiently avoided. The cutting tools are advantageously arranged in the relevant processing stage only on one side of the electrode foil and cut against an outer surface of a counter roller, that is to say against hard material or against rubber. A lower knife is advantageously dispensed with. A textured outer surface, in particular made of rubber, but alternatively also made of hard material, allows transverse tensile stresses and/or longitudinal tensile stresses to be introduced particularly effectively. The width of the calender rollers expediently corresponds to the width of the material region, so that transverse tensile stresses and, if necessary, additional longitudinal tensile stresses are also advantageously introduced in the calender laterally in the free regions by means of transverse draw rollers. A heating or tempering of the electrode foil or the calender rollers is not necessary in the present case, so that it is expediently dispensed with and energy is correspondingly saved. Any parting is functionally integrated into rollers, preferably into transverse draw rollers, so that a separate process step for parting is saved. Calendering is suitably divided into two method steps, thereby achieving an advantageous load distribution and a particularly high density of the electrode material. Calendering downstream of the slitting also advantageously squashes any burrs, thereby ensuring in particular that the finished electrodes have edge zone damage below 10 µm. Horizontal forces during the parting by means of the cutting tools on corresponding counter rollers are advantageously balanced by support rollers. By dual use of the calender rollers as a central calender roller between an upper and a lower calender roller, this central calender roller is optimally balanced.

A preferred embodiment is one in which the transverse draw rollers to the upper calender roller each have a textured outer surface with depressions and in which the transverse draw rollers each have a textured outer surface with elevations at the central calender roller, which are in particular designed in such a way that they engage in the depressions of the opposing transverse draw rollers when the electrode sheet is conveyed through. In this way, in particular a protruding profile or structure, which, viewed from the lower side, represents corresponding depressions, is formed on the upper side of the electrode sheet in the free region. The transverse draw rollers to the lower calender roller each preferably have a textured outer surface with depressions, which are similarly designed in such a way that they engage in the elevations of the opposite, central transverse draw rollers when the electrode sheet is conveyed through. In principle, however, a reverse arrangement of elevations and depressions is also conceivable and likewise suitable.

Slitting, calendering and notching are advantageously integrated in a single processing device. All method steps are carried out without any wrinkles. In this respect, the method is specifically, in particular, a method for wrinkle-free calendering and burr-free diverter cutting and longitudinal cutting of a continuously coated electrode sheet. The handling of the electrode sheet is significantly simplified, which results in improved cycle times in processing and high production speeds of between 80 m/min and 100 m/min, for example.

BRIEF DESCRIPTION OF THE DRAWINGS

Embodiments of the invention are explained in more detail below with reference to a drawing. They each show schematically:

FIGS. 2a-f each a detail view of an electrode sheet,

DETAILED DESCRIPTION OF THE INVENTION

Figure 1:
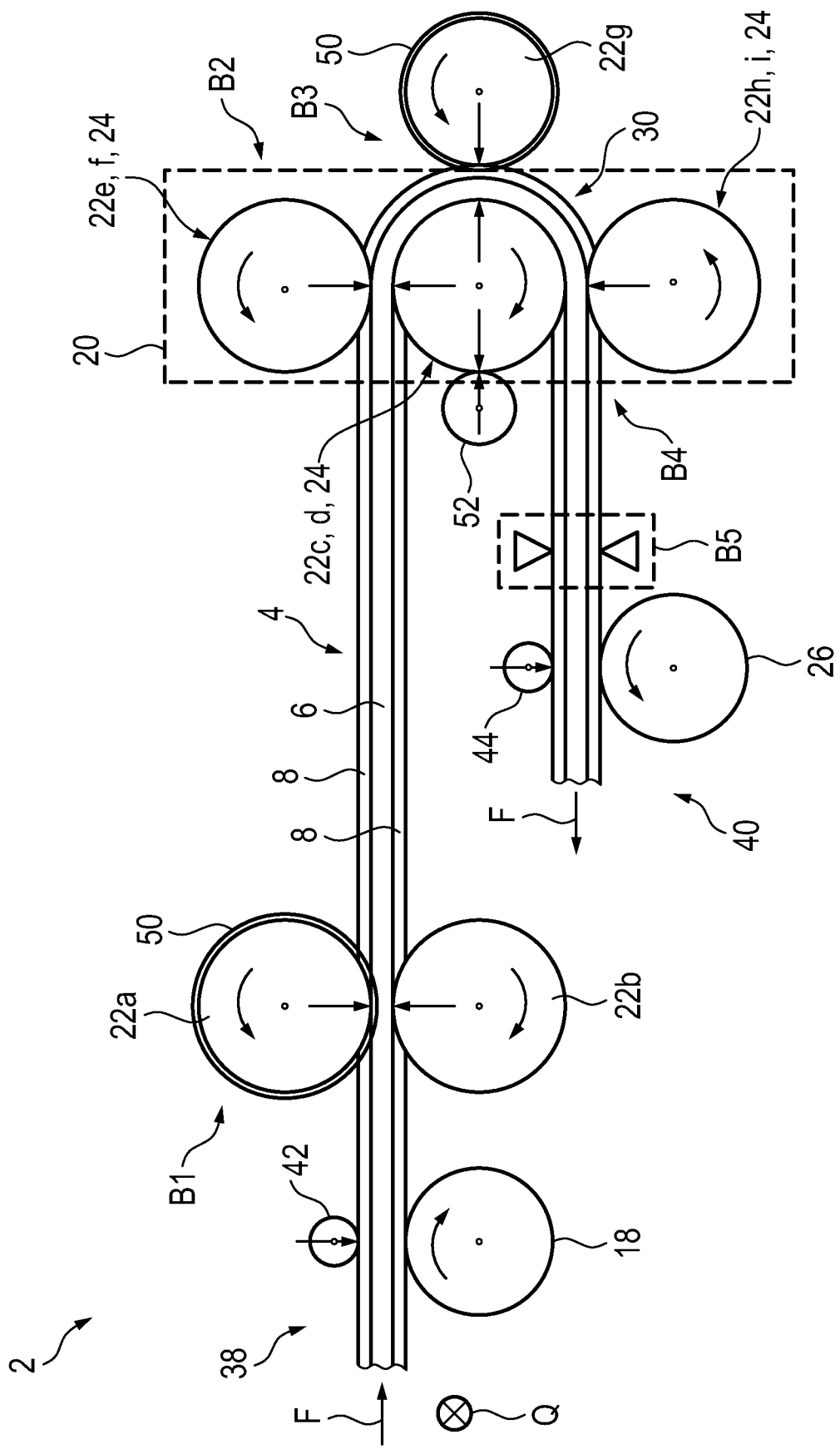
FIG. 1 a processing device.

In FIG. 1, an embodiment of a processing device 2 having four processing stages B1, B2, B3, B4 for carrying out a method for processing an electrode sheet 4 is shown as an example and in a sectional view. The electrode sheet 4 has a carrier layer 6 and an electrode material 8, which is applied to the carrier layer 6 only in a material region 10 of the electrode sheet 4, so that a free region 12, which is free of electrode material 8, remains for the formation of diverters 14. In FIGS. 2a-f, the electrode sheet 4 is shown in each case in detail in a top view during a method step of the method. The electrode sheet 4 serves as a semi-finished product and as a starting point for the production of individual electrodes 16 for a battery (not explicitly shown).

As part of the method, the electrode sheet 4 is guided in a conveying direction F through the processing device 2, so that the material region 10 and the free region 12 run alongside one another. The processing device 2 in FIG. 1 is a roll-to-toll device and the method is a roll-to-roll method. The electrode sheet 4 is unrolled from an unwinder 18 of the processing device 2. The conveying direction F corresponds to a longitudinal direction of the electrode sheet 4. A transverse direction Q runs transversely, i.e., perpendicularly here, to the longitudinal direction and thus also to the conveying direction F. The electrode sheet 4 lies in a plane which is spanned by the longitudinal direction and the transverse direction Q. The material region 10 and the free region 12 run alongside one another in the conveying direction F and are directly adjacent to one another. The free region 12 is characterized in that it is thinner than the material region 10, because the additional electrode material 8 is applied in this region. In FIGS. 1 and 2a-f, a single material region 10 runs centrally between two lateral free regions 12, which also form edge regions of the electrode sheet 4. However, the statements also apply analogously to other geometries.

The carrier layer 6 here has a thickness d1 in the range from 5 µm to 20 µm. The electrode material 8 is applied here on both sides with a thickness d2 in the range from 50 µm to 200 µm before it is fed into the processing device 2. Correspondingly, the electrode sheet 4 in the material region 10 has a thickness d3 in the range from 105 µm to 420 µm. In an alternative (not shown), the electrode material 8 is applied to the carrier layer 6 on only one side. The statements made here also apply analogously to a carrier layer 6 that is only coated on one side.

The processing device 2 has a calender 20 through which the electrode sheet 4 is guided and with which the material region 10 is calendered. As a result, a force is exerted perpendicularly both to the longitudinal direction and to the transverse direction Q, that is to say to the plane of the electrode sheet 4, by which force the electrode material 8 is pressed and compacted. In the present case, the electrode material 8 is compressed by a total of 30% to 50% in two successive stages. By pressing and compression, the calender 20 produces forces in the plane, i.e., in the transverse direction Q and/or in the longitudinal direction, i.e. in the conveying direction F, because these are the only remaining directions in which the electrode sheet 4 can move.

Figures 8, 9:
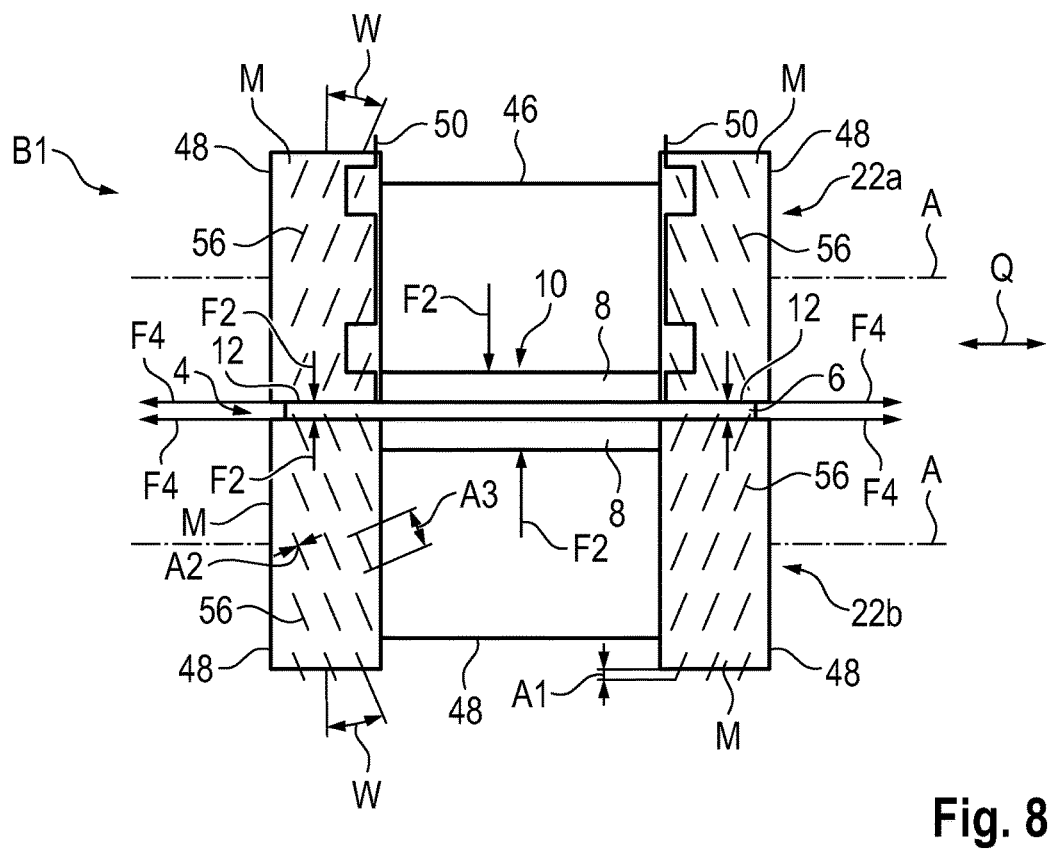
Figure 11:
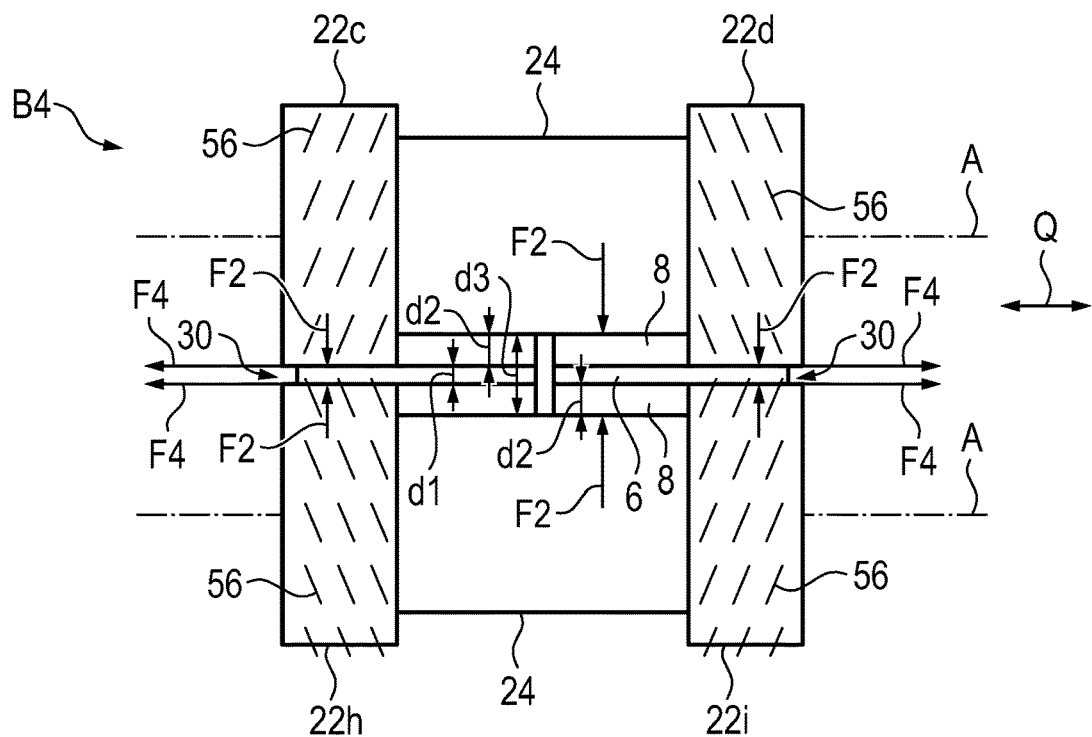

In the present case, the processing device 2 now additionally has at least one roller 22a-i, by means of which the carrier layer 6 is processed, more precisely the roller 22a-i designed such that it exerts additional tensile stress, in this case at least one transverse tensile stress F4, on the electrode sheet 4. In general, the rollers 22a-i are thus designed for processing the electrode foil 4. In the embodiment shown in FIG. 1, the processing device even has nine additional rollers 22a-i, which sometimes fulfill different functions at different positions along the conveying direction F and in the various processing stations B1-B4, as will be explained in more detail below. As can already be seen from FIG. 1, the relevant roller 22a-i is arranged either upstream or downstream of the calender 20 in the conveying direction F or within it, e.g., as shown as part of the third processing stage B3 in the conveying direction F between the two processing stages B2, B4 of the multi-stage calender 20. Further rollers 22a-f, 22h, 22i are arranged within the calender 20 perpendicular to the conveying direction F next to a relevant calender roller 24 in such a way that the roller 22a-f, 22h, 22i and the calender roller 24 have a common axis of rotation A, and then different longitudinal regions of the electrode sheet 4 can be processed differently at the same time, as can be seen in FIGS. 9 and 11. The additional rollers 22a-i are not calender rollers 24, but are used primarily or exclusively for processing the carrier layer 6 and not necessarily for processing the electrode material 8, which, however, is also processed under certain circumstances depending on the arrangement and functionality of a particular roller 22a-i relative to the electrode sheet 4.

Figure 3A:
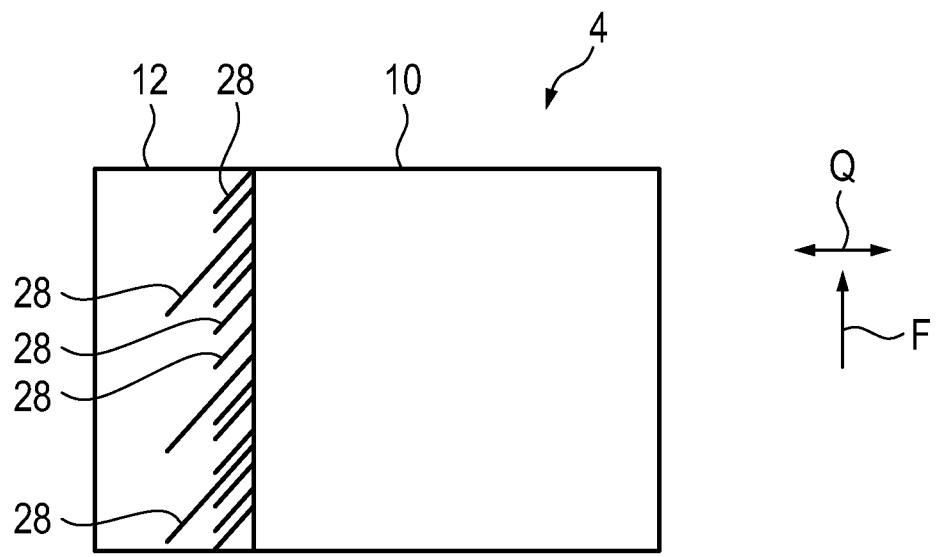
FIGS. 3a, 3b each a detail view of another electrode sheet with wrinkles.
Figure 3B:
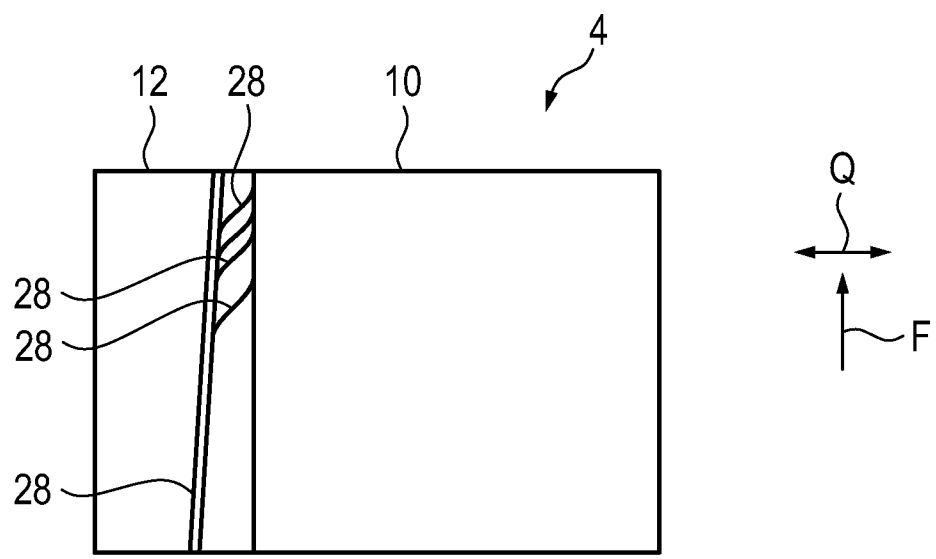

When the electrode sheet 4 is calendered, there is a risk of wrinkles 28 forming, which has negative effects on the quality of the electrode sheet 4. The formation of wrinkles 28 depends on the strength of a sheet tension F1 during processing, which tension is produced in the conveying direction F by the unwinder 18 and a winder 26. Two examples of an electrode foil 4 having wrinkles 28 are shown by way of example in FIGS. 3a and 3b.

Figure 4C:
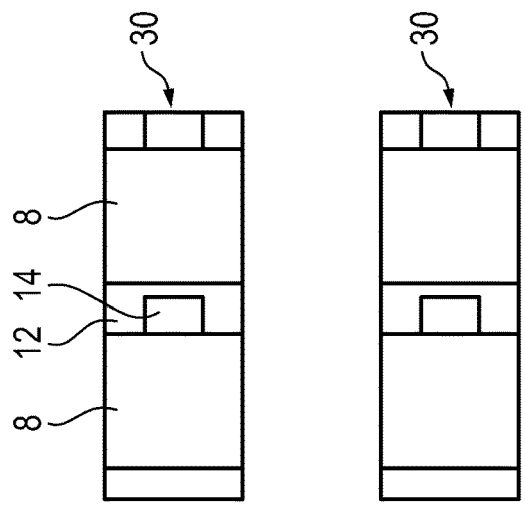
FIGS. 4a-c each a detail view of a different electrode sheet.
Figure 4B:
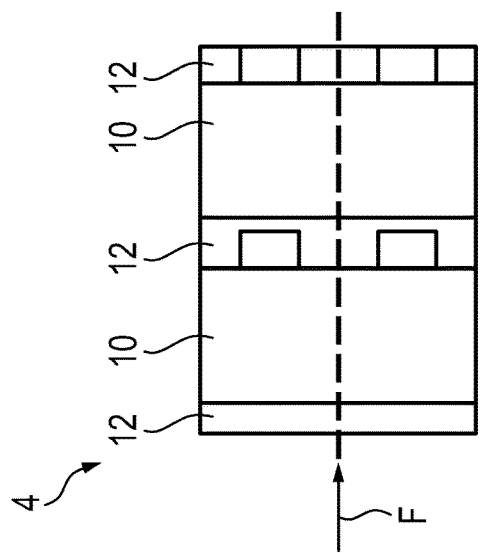
Figure 4A:
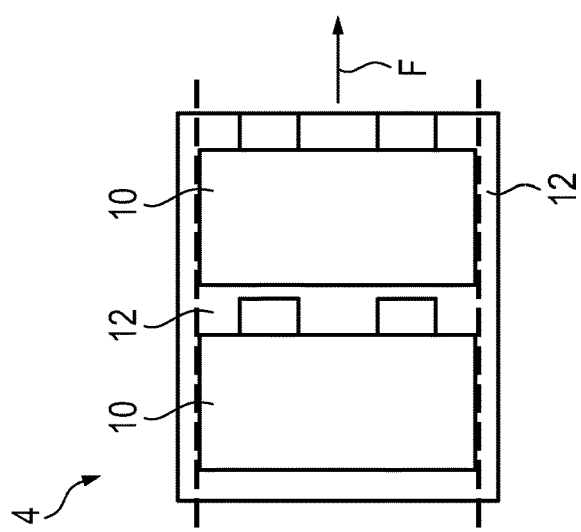

FIGS. 4a-c show by way of example how wrinkling can be avoided by coating the carrier layer 6 with electrode material 8 only in portions in the conveying direction F, so that an intermittently coated electrode sheet 4 results, with free regions 12 which extend transversely to the longitudinal direction, in addition to further, lateral free regions 12, each of which forms an outer edge. The entire electrode sheet 4 is first cut longitudinally, as can be seen in FIG. 4a, in order to remove the outer edges, whereby wrinkling is prevented during the subsequent calendering. After the calendering, a longitudinal cut is once again made in the center, as shown in FIG. 4b, in order to obtain a plurality of partial sheets 30 running parallel. The relevant longitudinal cutting is also referred to as "slitting" and represents an additional cutting operation that is carried out by means of a slitter (not explicitly shown). Finally, a relevant partial sheet 30 is then cut transversely as shown in FIG. 4c and thereby parted into longitudinal portions in order to obtain individual electrodes 16. Calendering and slitting take place on two different systems, so that the electrode sheet 4 is rolled up and unrolled again therebetween, as a result of which disadvantageous internal stresses form in the material. During the heating in the course of the calendering, these stresses are released, whereby wrinkles 28 then usually nevertheless arise. Another disadvantage is that the electrode sheet 4 is cut longitudinally twice, once before and once after calendering, so that a total of at least three processing stages are necessary, namely first slitting, then calendering, then second slitting.

Figure 5A:
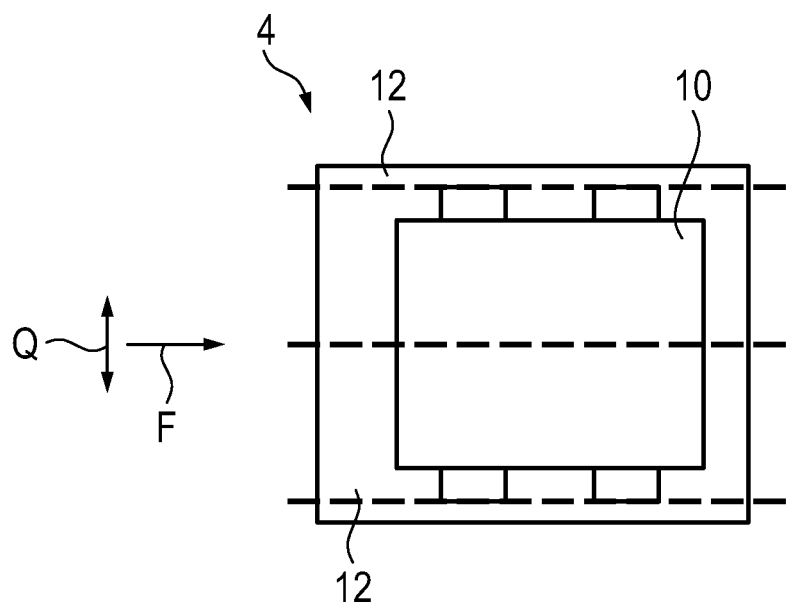
FIGS. 5a-b each a detail view of a different electrode sheet.
Figure 5B:
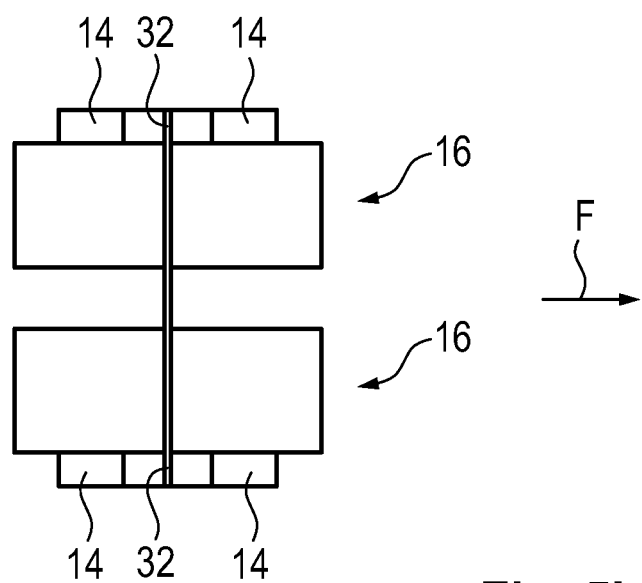

In contrast to an intermittently coated electrode sheet 4, a continuously coated electrode sheet 4 has a material region 10 that is continuously formed in the longitudinal direction and thus electrode material 8 that is continuously applied in the longitudinal direction. FIGS. 5a and 5b show by way of example how the formation of wrinkles in a continuously coated electrode sheet 4 can be reduced by heating the electrode sheet 4 during calendering, which takes place before the method step shown in FIG. 5a, and, in combination with the sheet tension F1 in the longitudinal direction, any regions of the electrode sheet 4 at risk of wrinkling are plastically deformed. The heating and plastic deformation also result in corresponding generation of heat and strain hardening, especially of the carrier layer 6 and can disadvantageously lead to increased oxidation and potentially worsen the weldability of the carrier layer 6. In FIG. 5a, the electrode sheet is cut longitudinally both on the side and in the center. While in the case of an intermittently coated electrode sheet 4 the diverters 14 are formed between two material regions 10 that follow one another in the longitudinal direction, in the case of a continuously coated electrode sheet 4 the diverters 14 are formed on the side of the material region 10, as can be seen in FIG. 5b. For the final formation of the diverters 14, a subsequent, separate notch is required in order to remove the intermediate regions 32 that still remain after the slitting.

Figure 6A:
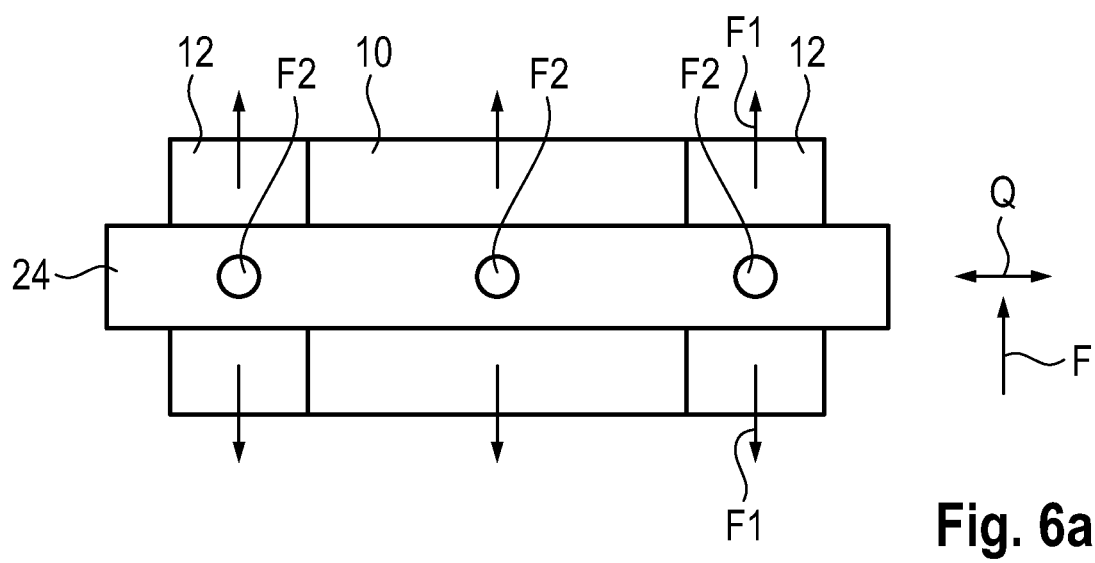
FIGS. 6a-d sheet tension, compressive stress and negative/positive elongation during processing of an electrode sheet, FIGS. 6e-6g longitudinal tension difference and compensation during processing of an electrode sheet, FIG. 7 a slitting of an electrode sheet with an upper and a lower knife, FIG. 8 a first processing stage of the processing device from FIG. 1, FIG. 9 a second processing stage of the processing device from FIG. 1, FIG. 10 a third processing stage of the processing device from FIG. 1, FIG. 11 a fourth processing stage of the processing device from FIG. 1, FIGS. 12a,12b different views of a roller with cutting tool, FIG. 13 a variant for a roller, and FIG. 14 another variant for a roller.
Figure 6B:
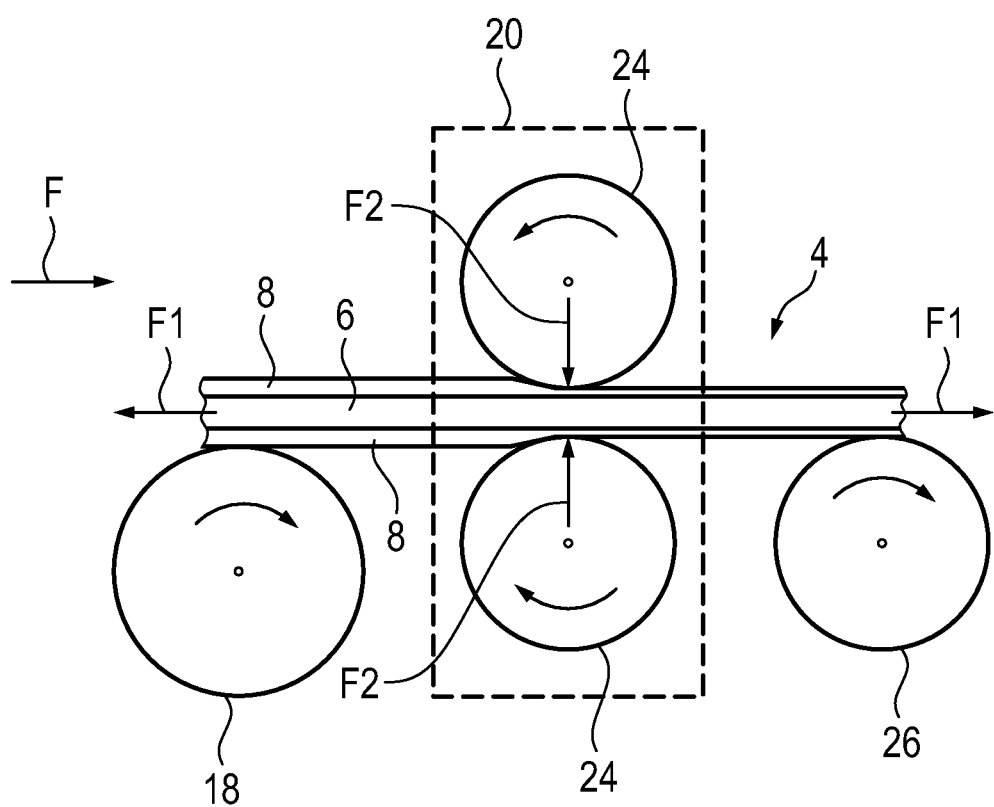
Figure 6C:
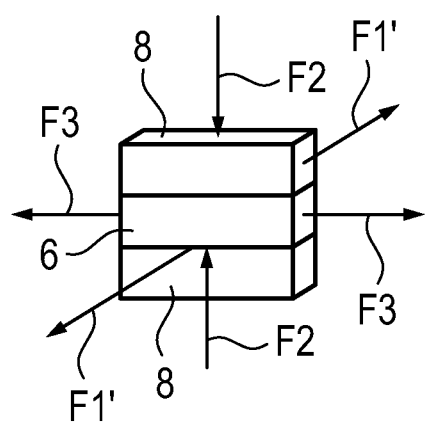
Figure 6D:
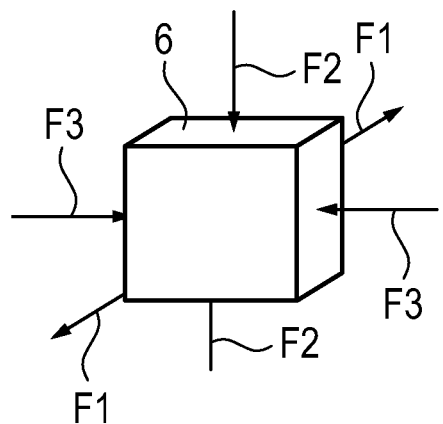

The problem of wrinkling during calendering will be explained in more detail with reference to FIGS. 6a-g. The starting point is the fact that the electrode sheet 4, viewed transversely to the longitudinal direction, has a different thickness d3, because the electrode material 8 is only applied over a partial width. FIG. 6c shows a notional volume element of the electrode sheet 4 in the material region 10, and FIG. 6d shows a notional volume element of the electrode sheet 4 in the free region 12. Different forces F1, F1', F2, F3 are applied to the volume elements. In the free region 12, the sheet tension F1 initially acts as tensile stress in the longitudinal direction. A compressive stress F2 of the calender 20 acts perpendicular to the electrode sheet 4, that is to say perpendicular to both the longitudinal and transverse directions Q, but only in the material region 10, because it is thicker. In the free region 12, no force acts perpendicular to the electrode sheet 4. The tensile stress in the longitudinal direction thus produces a compressive stress, that is to say a negative elongation F3, in the transverse direction Q, that is to say a negative elongation which draws the lateral free regions 12 toward the center. In contrast, the situation in material region 10 is different. The sheet tension F1 has the same effect here, but in addition there is the compressive stress F2 in the calender 20, i.e., negative elongation, which typically outweighs the sheet tension F1, so that an additional positive elongation F3 is produced in transverse direction Q which drives the material region 12 laterally outward. As a result, the lateral free regions 12 are thus driven toward the material region 10 and, conversely, the material region 10 is driven outward in the direction of the free regions 12, so that corresponding wrinkles 28 are formed here. In addition, due to the compressive stress, the calender 20 also produces an additional positive elongation in the longitudinal direction, which drives the material region 10 away from the calender 20 in the longitudinal direction. In FIG. 6c, this is indicated by the fact that the longitudinal tensile stress F1' now acts in the longitudinal direction, which is the sum of the sheet tension F1 and an additional longitudinal tensile stress caused by the calender 20, which is also referred to as the longitudinal tension difference dF. This does not apply to the free regions 12, so that as a result the material region 10 is stretched in the longitudinal direction, i.e., in the conveying direction F, but the free regions 12 are not, so that corresponding wrinkles are also formed here. The regions of the electrode sheet 4 of different thicknesses accordingly experience different longitudinal tensions, that is, forces in the longitudinal direction and transversely to the transverse direction Q.

Figure 6E:
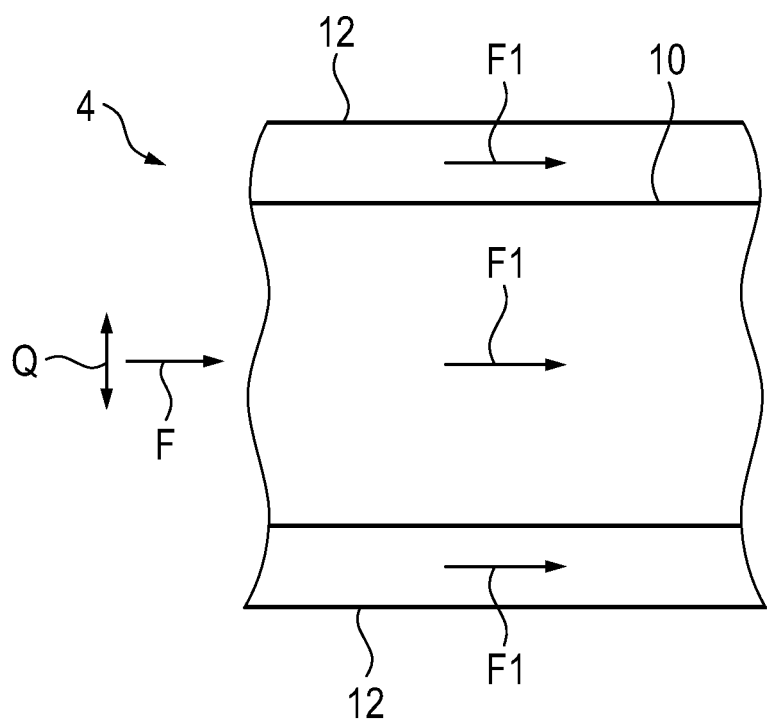
Figure 6F:
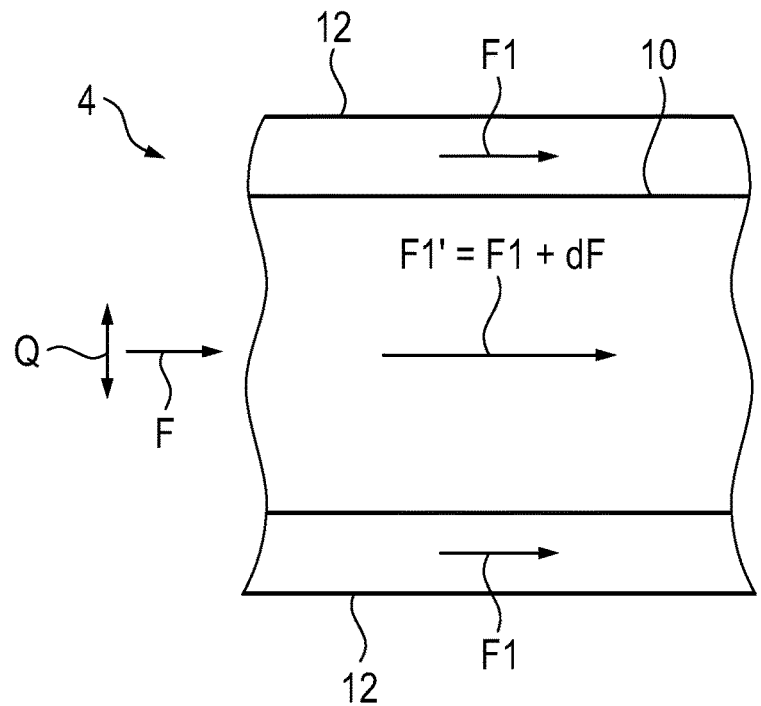
Figure 6G:
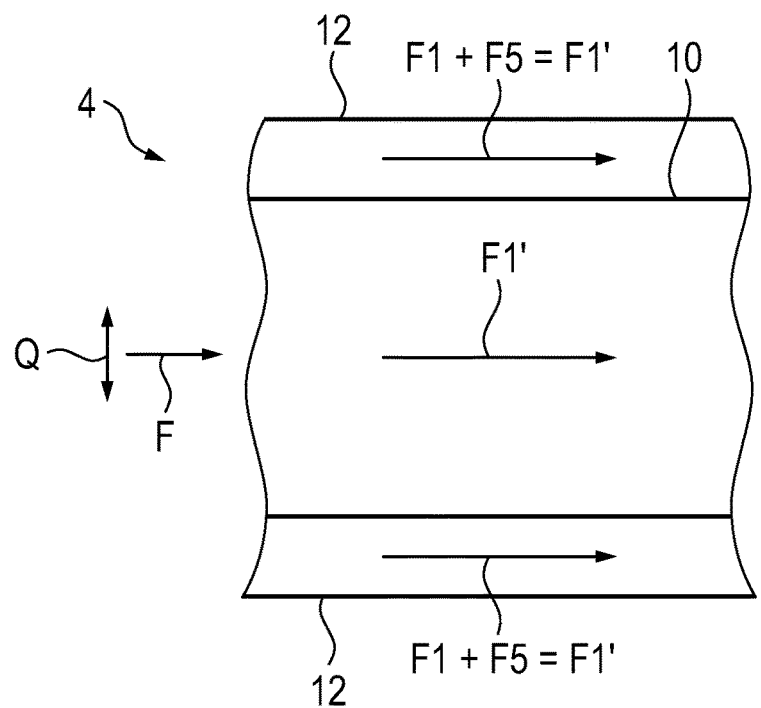

The longitudinal tension difference results from the difference between the sheet tension F1 and the longitudinal tensile stress F1'. This is shown by way of example in FIGS. 6e-g, wherein only the forces in the longitudinal direction are considered here for the sake of simplicity. FIG. 6e shows the electrode sheet 4 in a top view upstream of the calender 20. The sheet tension F1 initially acts both on the material region 10 and on the free regions. FIG. 6f shows the situation in the calender 20, which produces the longitudinal tension difference dF, so that in the material region 10 the longitudinal tensile stress F1' is greater than in the free region 12, where still only the sheet tension F1 acts. To compensate for this longitudinal tension difference dF, an additional longitudinal tensile stress F5 is exerted in FIG. 6f, for example in or after the calender 20 and, for example, by means of one or more of the rollers 22c-f, 22h, 22i, in order to compensate the longitudinal tension difference dF, so that the longitudinal tensile stress F1' results also in free regions, as can be seen in FIG. 6g. Alternatively or additionally, a correspondingly negative longitudinal tensile stress in the material region 20 by means of the roller 22g is also possible and suitable.

Figure 7:
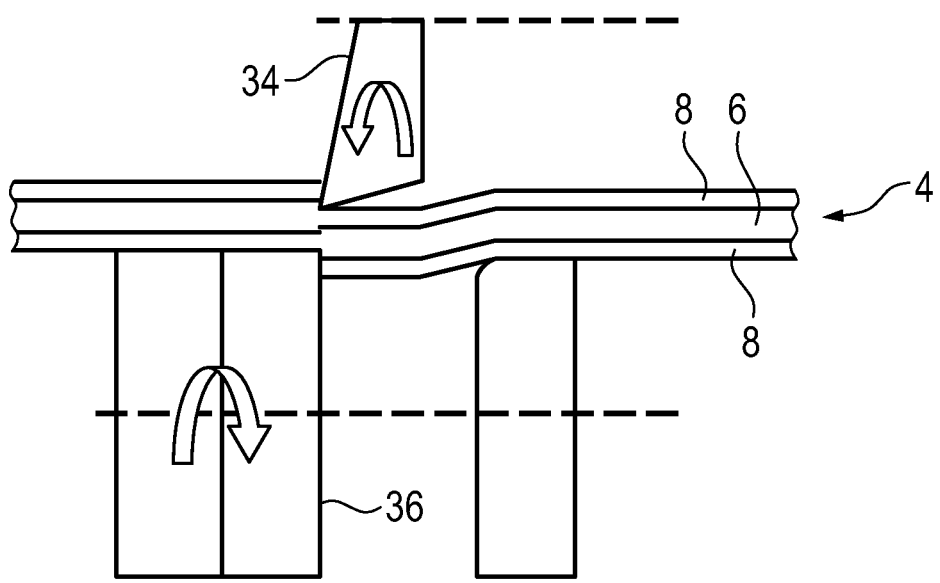

Another problem, namely the formation of burrs during slitting, will be explained below with reference to FIG. 7. In principle, it is possible to use a combination of two knives 34, 36 for the slitting operation, namely an upper knife 34 and a lower knife 36, which are arranged on opposite sides of the electrode sheet 4, each of which rotates and parts the electrode sheet 4 in the longitudinal direction like scissors. Because the knives 34, 36 scissor past each other, the material of the electrode sheet 4 is first drawn between the two knives 34, 36 during cutting, i.e., in the direction of a cutting edge here of the upper knife 34, so that wrinkles are created. In addition, tensile stress occurs in the region of the cutting edge, which leads to increased burr formation. There is also the risk that, as the knives 34, 36 undergo wear and tear, the material of the electrode sheet 4 initially warps out of its plane into a cutting gap, as can be seen in FIG. 7, before it is actually parted. The result is an uneven cut edge. Because of the scissoring action, there is also no resistance to this on the opposite side of a relevant knife 34, 36, so that the electrode sheet 4 accordingly deviates in this direction in an uncontrolled manner and forms a burr. The slitting is therefore very undefined overall and takes place in a very uncontrolled manner.

In the present case, one or more of the disadvantages mentioned are now eliminated by the additional rollers 22a-i. The configuration of the rollers 22a-i explicitly shown here represents a preferred embodiment, but only one of many suitable embodiments. The additional rollers 22a-i each rotate about an axis of rotation A perpendicular to the conveying direction F and are each arranged either on an upper side or a lower side of the electrode sheet 4, so that it is guided over an outer surface M of the relevant roller 22a-i. The direction of rotation of a relevant roller 22a-i is indicated by a corresponding arrow about the relevant axis of rotation A.

In the embodiment in FIG. 1, the processing device 2 has a sheet feed 38 for supplying the electrode sheet 4 and a sheet take-up 40 for receiving the processed electrode sheet 4. The sheet feed 38 is here the unwinder 18 in combination with a counter roller 42 which presses the electrode sheet 4 against the unwinder 18. The sheet take-up 40 is analogously a combination of the winder 26 with a counter roller 44, which the relevant partial sheet 30 against the winder 26. The winder 26 and the unwinder 18 produce the sheet tension F1 in the conveying direction F, which is indicated in FIG. 1 by corresponding arrows about the axes of rotation A.

Between the sheet feed 38 and the sheet take-up 40, the processing device 2 has a plurality of processing stages B1-B4, two of which are formed here by the calender 20 having the rollers 22c-f, 22h, 22i and the other two respectively by the rollers 22a, 22b, 22g. One method step of the method is carried out by means of the four processing stages B1-B4. The combination of processing steps B1-B4 shown here and their relative position to each other represent a suitable design, but are not mandatory in this form, so that further suitable designs result by omitting or adding one or more processing steps B1-B4 as well as through other combinations and/or relative positions of the processing stages B1-B4 to one another.

Figure 2C:
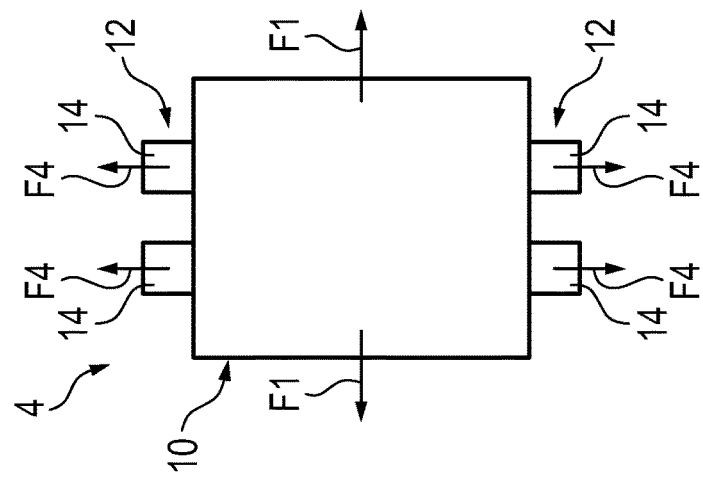
Figure 2B:
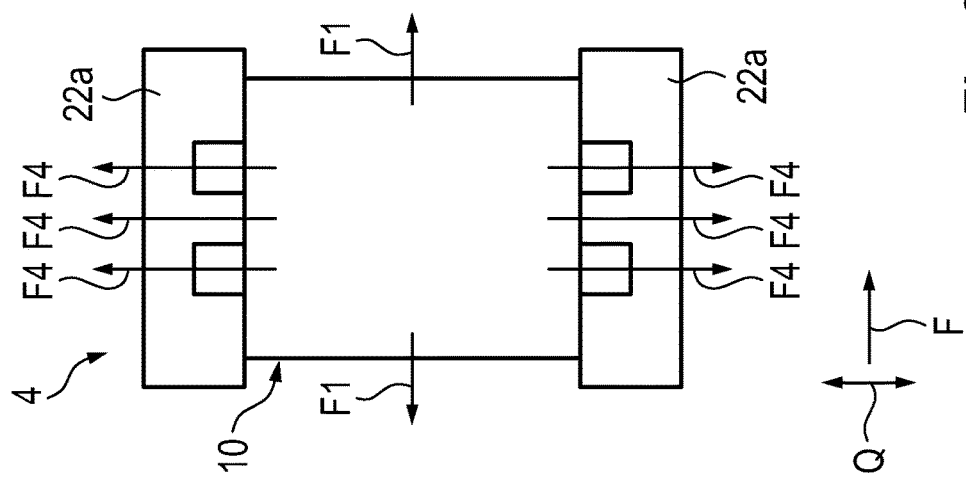
Figure 2A:
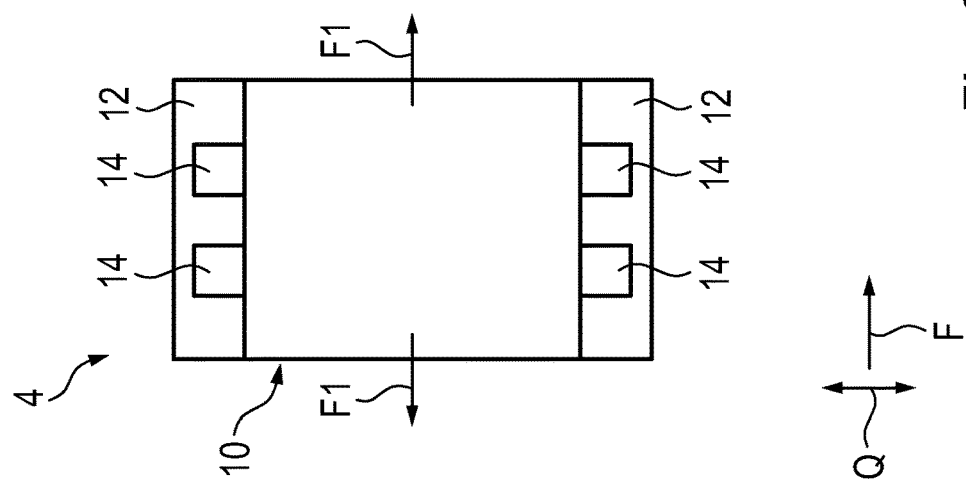

The processing device 2 shown in FIG. 1 has a first processing stage B1 downstream of the sheet feed 38 in the conveying direction F with a roller 22a which is designed such that it engages the free region 12 and exerts a transverse tensile stress F4 therein and at the same time forms recurrent diverters 14 in the free region 12. The first processing stage B1 is shown in FIG. 8 in a view along the conveying direction F, so that the transverse direction Q lies in the plane of the drawing. Roller 22a is both a transverse draw roller and a cutting roller, with an inner portion 46 for the material region 10 and two lateral outer portions 48 for exerting a transverse tensile stress F4 in the lateral free regions 12. Arranged on the opposite side of the electrode sheet 4 is a further roller 22b, which on the one hand is also a transverse draw roller and on the other hand is a counter roller for a cutting tool 50 of the other roller 22a. The first processing stage B1 is thus a total of a pair of rollers and realizes a first method step, which is shown in FIG. 2b and in which the electrode sheet 4 is notched, i.e., in which diverters 14 are formed to the side. Under the influence of transverse tensile stress F4 on the one hand and sheet tension F1 on the other hand, diverters 14 are repeatedly cut from the relative free region 12. The rollers 22a, 22b produce enough transverse tensile stress F4 that wrinkles are smoothed out or do not even arise. At the same time, due to the transverse tensile stress F4, the waste that occurs during the parting in the free region 12 is removed to the side. Optionally, one or both rollers 22a, 22b also produce an additional longitudinal tensile stress F5 in order to compensate for a longitudinal tension difference dF caused by the calender 20.

Furthermore, the processing device 2 in FIG. 1 has a second processing stage B2, which is shown in more detail and in a view along the conveying direction F in FIG. 9, so that the transverse direction Q is in the plane of the drawing. The second processing stage B2 has two calender rollers 24 of the calender 20 on opposing sides of the electrode foil 4 for compressing the electrode material 8. The additional rollers 22c, 22d, 22e, 22f are in this case designed as transverse draw rollers and are each arranged on the side of one of the calender rollers 24. Thus, the processing device 2 in the second processing stage B2 here has a total of four additional rollers 22c-f such that a particular one of the two calender rollers 24 is bordered on both sides in the transverse direction Q by two of the additional rollers 22c-f, i.e., by two transverse draw rollers, and with them has a common axis of rotation A. The relevant calender roller 24 is only as wide as the material region 10 and only acts on this material region 10, so that the additional rollers 22c-f act only on the free regions 12. The second processing stage B2 follows the first processing stage B1, so that the calendering takes place after the notching and the transverse draw rollers of the second processing stage B2 act on the diverters 14 that have already been formed. Also, the second processing stage B2 is overall a pair of rollers. The second processing stage B2 realizes a second method step as shown in FIG. 2c in which the electrode material 8 is compressed without wrinkles under the influence of transverse tensile stress F4 on the one hand and sheet tension F1 on the other. A transverse tensile stress F4 is only produced on the side in the free regions 12 by the lateral rollers 22c-f, while the electrode material 8 is calendered in the center by the calender rollers 24. Optionally, one or more of the rollers 22c-f also produce an additional longitudinal tensile stress F5 in order to compensate for a longitudinal tension difference dF caused by the calender 20 directly in the calender 20.

Figure 10:
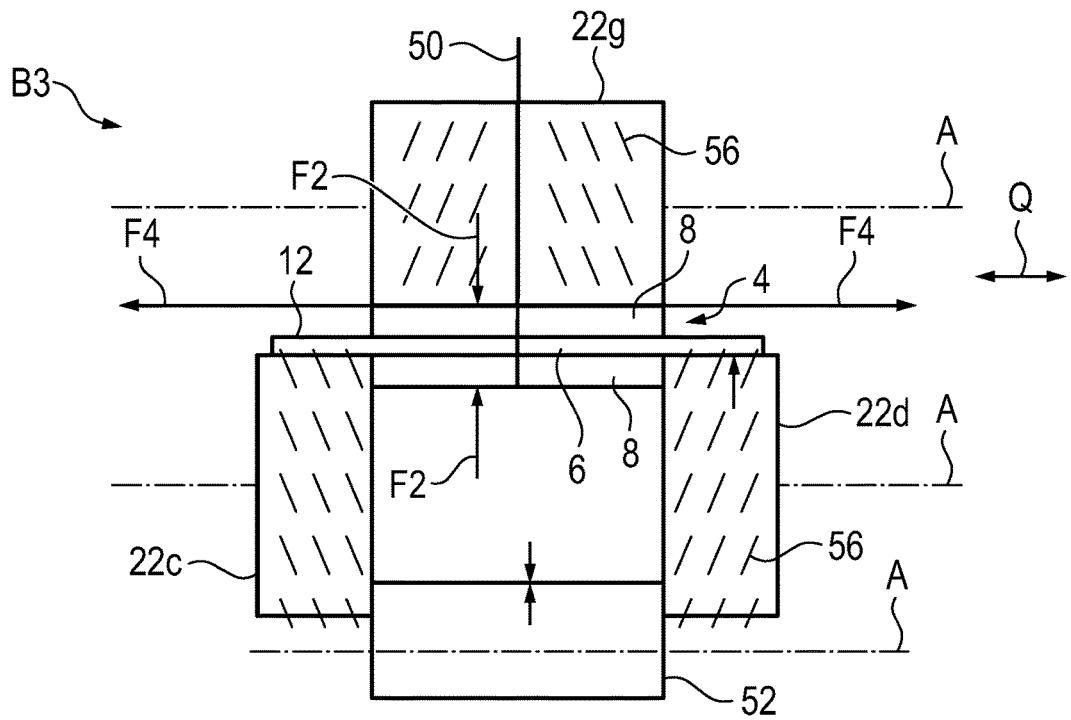

Furthermore, the processing device 2 in FIG. 1 has a third processing stage B3, which is shown more precisely and in a view along the conveying direction F in FIG. 10, so that the transverse direction Q lies in the plane of the drawing. The third processing stage B3 has a roller 22g, in which a cutting tool 50 is integrated, for processing the carrier layer 6 in such a way that it is parted by means of the cutting tool 50. At the same time, the roller 22g is designed in such a way that it engages the material region 10 and in this exerts a transverse tensile stress F4 on both sides inward and outward. The roller 22g is accordingly a transverse draw roller and at the same time also a cutting roller, namely more precisely a slitter for producing partial sheets 30. Optionally, an additional longitudinal tensile stress F5 is also produced by means of the roller 22g in order to compensate for a longitudinal tension difference dF caused by the calender 20. On the opposite side of the electrode sheet 4, one of the calender rollers 24 is arranged as a counter roller. In addition, there is a support roller 52 opposite the roller 22g. The third processing stage B3 follows the second processing stage B2 and implements a third method step as shown in FIG. 2d, in which the electrode sheet 4 is slit, i.e., in which a plurality of partial sheets 30 is formed by, in this case, even a central longitudinal cut. The electrode sheet 4 is accordingly parted into a plurality of partial sheets 30 under the influence of transverse tensile stress F4 on the one hand and sheet tension F1, possibly in combination with an additional longitudinal tensile stress F5 on the other hand. Aside from this, in contrast to the calender rollers 24, the roller 22g only produces a normal compressive stress F2 such that the electrode material 8 is initially not further compressed during slitting.

Furthermore, the processing device 2 in FIG. 1 has a fourth processing stage B4, which is shown more precisely and in a view along the conveying direction F in FIG. 11, so that the transverse direction Q lies in the plane of the drawing. The fourth processing stage B4, like the second processing stage B2, again has two calender rollers 24 of the calender 20 on opposite sides of the electrode sheet 4, for re-compressing the electrode material 8. The second and fourth processing stages B2, B4 thus form the calender 20 as a two-stage calender 20. One of the calender rollers 24 together with its side rollers 22c, d has a dual use. Analogous to the second processing stage B2, in the fourth processing stage B4 the additional rollers 22c, 22d, 22h, 22i are each designed as a transverse draw roller and are arranged to the side of a relevant calender roller 24 so that a relevant calender roller 24 is bordered on both sides in the transverse direction Q by two transverse draw rollers and together with them has a common axis of rotation A. The calender roller 24 is only as wide as the material region 10, so that the transverse draw rollers only act on the free region 12. The fourth processing stage B4 follows the third processing stage B3, so that after the slitting in the third processing stage B3 the electrode material 8 of the partial sheets 30 is further compressed. The fourth processing stage B4 realizes a fourth method step as shown in FIG. 2e, in which the partial sheets 30 are calendered and any burrs from the third processing stage B3 are squeezed. This also takes place under the influence of transverse tensile stress F4 on the one hand and sheet tension F1 on the other. Analogous to the second processing stage B2, a transverse tensile stress F4 is only laterally produced in the free region 12 by the lateral transverse draw rollers 22c, 22d, 22h, 22i, while the electrode material 8 is calendered in the center by the calender rollers 24. Similar to the second processing stage B2, an additional longitudinal tensile stress F5 is optionally produced by means of one or more of the rollers 22c, 22d, 22h, 22i in order to compensate for a longitudinal tension difference dF caused by the calender 20 directly in the calender 20.

In FIG. 1, an optional cleaning stage B5, by means of which the partial sheets 30 are cleaned in a fifth method step, is arranged upstream of the winder 26 and downstream of the aforementioned processing stages B1-B4. Downstream of the winder 26, the partial sheets 30 are separated into electrodes 16 in the embodiment shown, as shown in FIG. 2f, in that the partial sheets 30 are parted by means of a transverse cutting tool (not explicitly shown) into suitably long longitudinal portions, each of which then represents an electrode 16.

As is clear from the above statements, a relevant roller 22a-i is designed in such a way that it exerts a transverse tensile stress F4 and possibly also a longitudinal tensile stress F5 for processing the carrier layer 6 on the electrode sheet 4 and especially on the carrier layer 6 in order to avoid wrinkling. The roller 22a-i is therefore also referred to as a transverse draw roller or a transverse draw and longitudinal tension roller; in the following, only the term "transverse draw roller" is used without restricting the generality. The transverse tensile stress F4 is a force which acts transversely, i.e., perpendicular to the longitudinal direction and thus also to the conveying direction F here. The transverse tensile stress F4 acts laterally outward and thus presses the carrier layer 6, starting from a center of the electrode sheet 4, in each case outward to the side. The electrode sheet 4 and especially its carrier layer 6 are accordingly stretched or tightened in the transverse direction Q by means of the roller 22a-i and, so to speak, drawn smooth. In contrast, the longitudinal tensile stress F5 acts along the longitudinal direction and the conveying direction F and thus transversely to the transverse tensile stress Q. The electrode sheet 4 and especially its carrier layer 6 are then, depending on the embodiment, stretched or compressed in the longitudinal direction by means of the roller 22a-i and also, so to speak, drawn smooth.

The transverse tensile stress F4 and also the longitudinal tensile stress F5 can be adjusted as required by the specific design of the roller 22a-i and adapted to the specific application. In particular, the transverse tensile stress F4 and the possibly additional longitudinal tensile stress F5, which are used to optimally avoid wrinkles, are dependent on the thickness d3 of the electrode sheet 4 in the material region 10 and its compression in the calender 20, i.e., the compressive stress F2 in the calender 20, but also dependent on the sheet tension F1 in the conveying direction F.

The rollers 22a-f, 22h, 22i are designed, as already described, in such a way that they engage the free region 12 and exert the transverse tensile stress F4 and optionally also the longitudinal tensile stress F5 therein. In contrast, the roller 22g in FIG. 10 is designed differently, namely in such a way that it engages the material region 10 and exerts the transverse tensile stress F4 and optionally also an additional longitudinal tensile stress F5, expediently in the direction opposite the free region 12. For this purpose, the roller 22g has two transverse portions 54 viewed in the transverse direction Q and along its axis of rotation A, namely a left-hand portion which extends from the center of the material region 10 in the transverse direction Q to one side, and a right-hand portion which extends accordingly from the center of the material region 10 in the transverse direction Q to the other side. The two transverse portions 54 now each exert a transverse tensile stress F4 in mutually opposite directions, so that the material region 10, starting from the center, is stretched or driven outward on both sides. In the case of an additional longitudinal tensile stress L5, on the other hand, this is exerted equally by both portions of the roller 22g.

To exert the transverse tensile stress F4 and possibly also the longitudinal tensile stress F5, the relevant roller 22a, b is designed in such a way that it exerts a greater compressive stress F1 on the free region 12 than on the material region 10. For this purpose, the roller 22a, 22b, 22i has a larger diameter in the free region 12 than in the material region 10, in that a relevant outer portion 48 has a larger diameter than the inner portion 46. The same applies analogously to the combination of the rollers 22c-f, 22h, 22i as outer portions 48 with the calender rollers 24 as inner portions 46.

In addition, in the embodiment shown a relevant roller 22a-i for exerting the transverse tensile stress F4 and possibly also the longitudinal tensile stress F5 has an outer surface M which is wholly or partly made of a rubber, for example a polyurethane. In the direction of rotation about the roller 22a-i, the rubber is formed continuously, that is to say without interruption. In the case of the rollers 22a, 22b, the outer surface M is made of rubber only along the relevant outer portion 48. The rollers 22a, 22b each has, for example, a cylindrical base body which is coated with a rubber layer along a relevant outer portion 48, so that here an outer surface M made of rubber is produced, while the outer surface M is made of the material of the base body formed along the inner portion 46. As a result of the sheathing with rubber, a relevant outer portion 48 then automatically also has a larger diameter than the inner portion 46, wherein the difference between these diameters corresponds to a thickness of the rubber layer. This can also be applied analogously to the calender rollers 24, provided that they extend in the transverse direction beyond the material region 10 and are then provided accordingly with a rubber layer in the free region 12, so that rollers 22c-f, 22h, 22i are then formed here with an outer surface M made of rubber.

In addition, the rollers 22a-i for exerting the transverse tensile stress F4 and possibly also the longitudinal tensile stress F5 also have here a textured outer surface M, i.e., a texture surrounding the outside, by means of which a transverse tensile stress F4 is produced on the electrode sheet 4, especially its carrier layer 6. In FIGS. 8-11, the textured outer surface M has elevations or depressions 56 or both, so that the friction of the roller 22a-i is correspondingly increased, at least in the region of the textured outer surface M. The texture comprises, for example, a multiplicity of ribs and/or grooves which, as can be seen in FIGS. 8-11, run parallel to one another and in each case straight. The corresponding elevations and/or depressions 56 on both outer surfaces M are designed here to be complementary to one another, so that a depression 56 on the outer surface of the roller 22a, 22e, 22f, 22h, 22i, which is arranged here in each case on the upper side, is opposite an elevation 56 on the roller 22b, 22c, 22d, which is arranged on the corresponding lower side, in particular in such a way that they interlock. In the present case, the roller 22g is formed with elevations 56, so that it forms corresponding depressions in the electrode material 8.

The texture is set at an engagement angle W relative to the conveying direction F, so that when the roller 22a-i rotates and engages the electrode sheet 4, a corresponding transverse tensile stress F4 and optionally also a corresponding longitudinal tensile stress F5 results, as shown by way of example in FIG. 8. The engagement angle W is set in the present case in such a way that the resulting transverse tensile stress F4, and possibly also the longitudinal tensile stress F5, generally balance the forces due to compressive stress F2 in calender 20 and sheet tension F1 in processing device 2 and thereby prevent any wrinkling. The engagement angle W is dependent on the thickness d2 of the electrode material 8 and the compression provided in the calender 20.

The engagement angle W here corresponds to that angle at which the wrinkles 28 run which would be produced if no additional transverse tensile stress F4 were produced by means of the rollers 22a-i. The engagement angle W is set, for example, by a suitable roller 22a-i being selected from a set of rollers having differently textured outer surfaces M and being inserted into the processing device 2. Alternatively, only the rubber layer can be exchanged and, in order to set the engagement angle W, only the rubber layer on the base body is exchanged, similar to a tire change.

The texture here is also a microstructure, i.e., the elevations and depressions 56 have only small dimensions A1, A2, A3. In FIGS. 8-11, the elevations and/or depressions 56 of the textured outer surface M have a height or depth A1 between 50 µm and 1000 µm, a width A2 between 100 µm and 500 µm and a length A3 between 3000 µm and 5000 µm. In the figures, elevations and/or depressions 56 are shown having a geometry that is straight, but this is not mandatory, but in one variant the geometry is adapted to the geometry of the wrinkles 28 and corresponds thereto.

In the second, third and fourth processing stages B2, B3, B4, rollers 22c-i having a textured outer surface M are used which possibly produce a structure or profile of the carrier layer 6 and/or the electrode material 8. A pattern (not explicitly shown) is thus embossed in the free region 12 and/or in the material region 10 by the textured outer surface M. In the present case, this is compensated for at least in the material region 12 by means of the fourth processing stage B4, that is to say the electrode sheet 4 is smoothed with the fourth processing stage B4. For this purpose, in the fourth processing stage B4 the calender rollers 24 as shown in FIG. 11 have not a textured, but rather a smooth outer surface M in order to smooth the electrode material 8 in the material region 10 after it has possibly been structured or profiled by the roller 22g with a textured outer surface in the third processing stage B3 M. The other calender rollers 24 also each have a smooth outer surface M in the present case.

In the configurations according to FIGS. 9-11, the upper rollers 22e, 22f each have a textured outer surface M with depressions 56 for the upper calender roller 24, and the central rollers 22c, d to the central calender roller 24 each have a textured outer surface M with elevations 56, which are also designed here such that they engage in the depressions 56 of the opposing rollers e, f when the electrode sheet 4 is conveyed through. In this way, a protruding profile or structure is formed on the upper side of the electrode sheet 4 in the free region 12, which profiling, when viewed from the lower side, shows corresponding depressions 56. The lower rollers 22h, 22i to the lower calender roller 24 also have a textured outer surface M with depressions 56, so that they engage in the elevations 56 of the central rollers 22c, 22d. At the same time, the lower calender roller 24 smooths any possible profiling of the electrode material 8, which was previously structured by the elevations 56 of the roller 22g, namely with depressions on the upper side of the electrode sheet 4.

The two rollers 22a, 22b and the rollers 22c-f, 22h, 22i are designed identically with regard to the production of the transverse tensile stress F4 and possibly also the longitudinal tensile stress F5, specifically with the same dimensions, the same textures and the same materials, wherein the textures may, however, differ in that depressions 56 are formed on one side of the electrode sheet 4 and elevations 56 on the other side. In this regard, the roller 22a is designed as a mirror image of the roller 22b, wherein the electrode sheet 4 forms a mirror plane. Likewise, the rollers 22c, 22d are formed as mirror images of the rollers 22e, 22f, 22h, 22i. The rollers 22a, 22b have opposite directions of rotation, likewise the rollers 22c, 22d have a direction of rotation opposite the direction of rotation of the rollers 22e, 22f, 22h, 22i. The roller 22g has a direction of rotation opposite to that of the rollers 22c, 22d.

Figure 13:
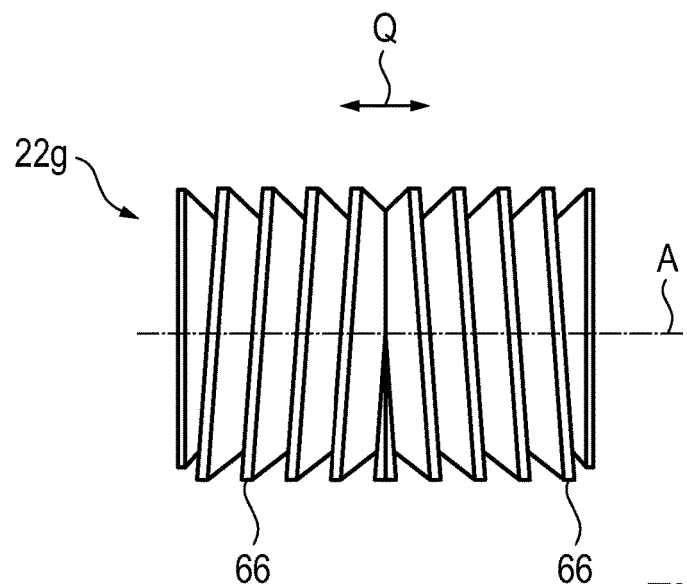
Figure 14:
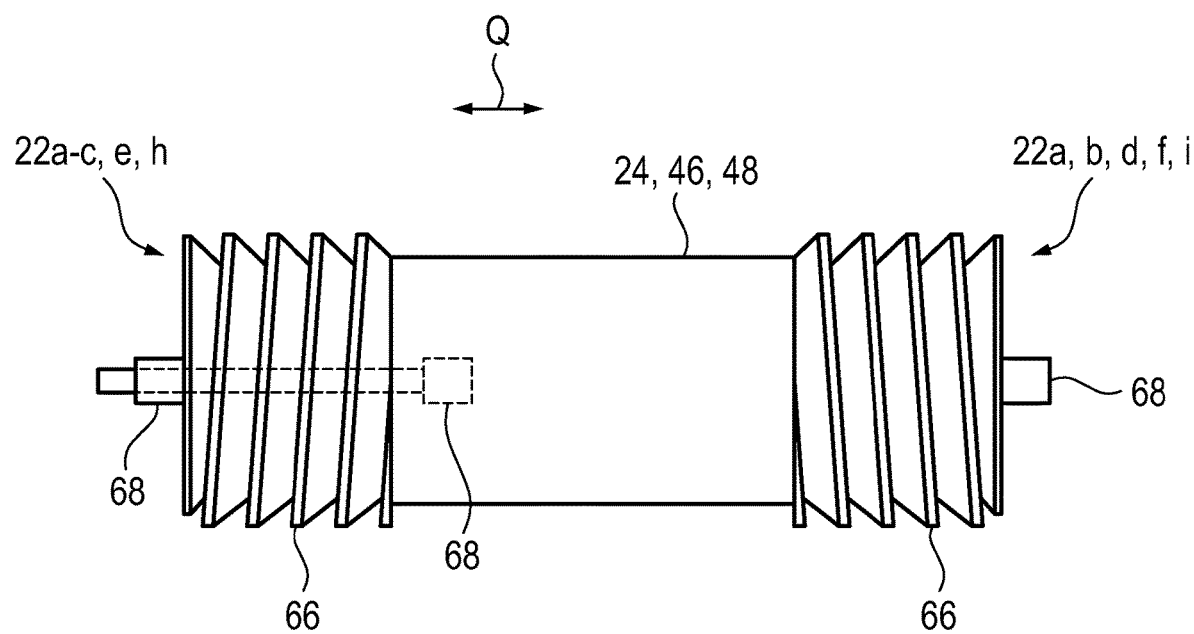

Alternatively or additionally, the roller 22a-i for exerting the transverse tensile stress F4 and possibly also the longitudinal tensile stress F5 is formed in a volute, i.e., spiral, threadlike, helical or the like manner. Embodiments for this are shown in FIGS. 13 and 14, wherein FIG. 13 shows an embodiment for a helical roller 22g and FIG. 14 an embodiment for a helical roller 22a-f, 22h, 22i. FIGS. 13 and 14 show the relevant roller 22a-i viewed along the conveying direction F, i.e., from the front or the rear. The roller 22a-i has an outer surface M, with a rib 66, which runs helically about the roller 22a-i, so that it is overall designed in a helical manner, wherein the rib 66 then forms a thread, so to speak. An edge, a protrusion or the like are equivalent to a rib 66. The rib 66 is here per se similar to the ribs of the texture of the outer surface M described above, but typically larger, and accordingly a single rib 66 is already sufficient. The helical design achieves a conveying effect in the transverse direction Q, by means of which the transverse tensile stress F4 is produced and optionally also the longitudinal tensile stress F5. The electrode sheet 4 is accordingly driven by the helical roller in the transverse direction Q and thus drawn smooth. The rib 66 of the roller 22a-i runs either counterclockwise or clockwise, depending on where the roller 22a-i is arranged relative to the electrode sheet 4 and in which direction an additional force is required to smooth or avoid wrinkles. In FIG. 13, the roller 22g engages the material region 10 and, regarding the helical configuration, is therefore designed to be mirror-symmetrical with respect to a mirror plane which is perpendicular to the transverse direction Q. In this way, as shown in FIG. 13, the rib 66 then runs counterclockwise on a first half of the roller 22g and clockwise on a second half.

As an alternative or in addition to the aforementioned concepts of exerting a longitudinal tensile stress F5 by means of friction, the roller 22a-i for exerting the longitudinal tensile stress F5 in one variant has a drive 68, for example an electric motor. Such a drive 68 is used, for example, if it is not possible to compensate for the longitudinal tension difference dF by means of friction alone, as described. The drive 68 rotates the roller 22a-i and thus produces a slip relative to the calender roller 24 and a corresponding force on the electrode sheet 4 in or counter to the conveying direction F and thus ultimately an additional longitudinal tensile stress F5. If the roller 22c-f, 22h, 22i is arranged inside the calender 20 and next to a calender roller 24 and has a common axis of rotation A with this calender roller 24, the roller 22c-f, 22h, 22i and the calender roller 24 then have, as shown for example in FIG. 14, drives 68 that are separate from each other, so that the roller 22c-f, 22h, 22i and the calender roller 24 can be rotated at different speeds in order to compensate for the longitudinal tension difference dF.

Figure 12A:
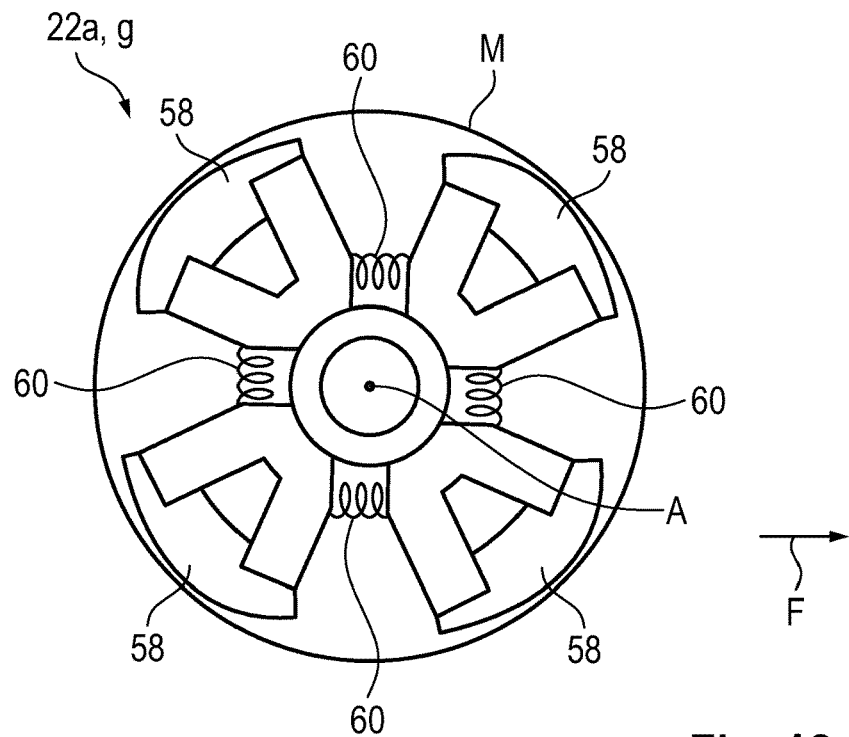
Figure 12B:
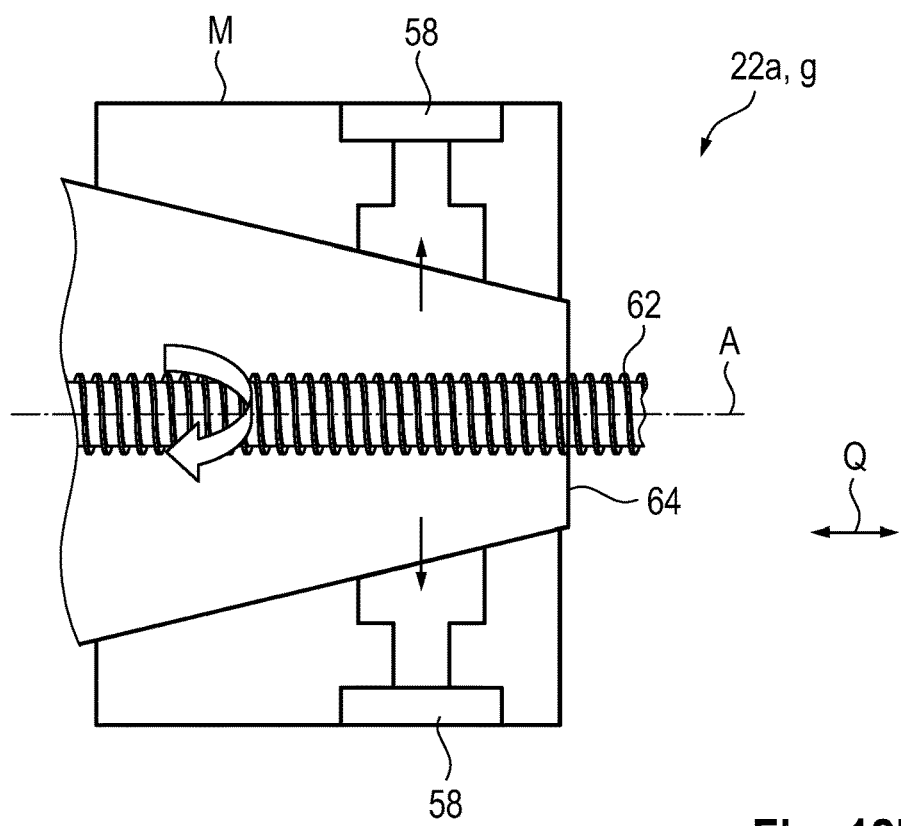

The relevant cutting tool 50 here is a knife having a number of blades 58, wherein "a number of" is understood to mean "one or more." An example of a roller 22a, 22g with a cutting tool 50 is shown in FIG. 12a in a sectional view perpendicular to the axis of rotation A and in FIG. 12b in a sectional view along the axis of rotation A. The roller If the processing takes place only in the free region 12, likewise only the carrier layer 6 is also parted with the cutting tool 50. If the processing takes place in the material region 10, the electrode material 8 is also parted in addition to the carrier layer 6 due to the principle.

As shown in FIG. 2b, in order for the carrier layer 6 to be parted by means of the cutting tool 50 in the free region 12 in the first processing stage B1 in such a way that diverters 14 are repeatedly formed, first longitudinal portions of the free region 12 are repeatedly cut out by means of the cutting tool 50 of the roller 22a, so that gaps arise, between which second longitudinal portions of the free region 12 are left in place as diverters 14. As a result, the electrode sheet 4 is notched, so that subsequent notching is no longer necessary. This results in a side edge in the form of a rectangular signal. The cutting tool 50 accordingly has a number of longitudinal blades which cut in the longitudinal direction and a number of transverse blades which cut in the transverse direction. The longitudinal blades are arranged alternately on the inside and outside in the direction of rotation of the roller 22a in order to have longitudinal portions cut away or left in place correspondingly. A transverse blade is arranged in the direction of rotation between two longitudinal blades in order to separate successive longitudinal portions of the free region 12 from one another.

As shown in FIG. 2d, in order to part the carrier layer 6 centrally along the longitudinal direction in the material region 10 by means of the cutting tool 50 in the third processing stage B3 such that a plurality of partial sheets 30 are formed which run alongside one another, the cutting tool 50 of the roller 22g has a number of blades 58 which are arranged along a common circumferential line about the roller 22g and one behind the other in the direction of rotation, so that a straight cut in the conveying direction F results.

In the present case, the cutting tool 50 shown in FIGS. 12a, 12b has an adjustable cutting depth in that the blades 58 can be moved into or out of the roller 22a, 22g. In the embodiment shown, the blades 58 of the cutting tool 50 are resiliently connected to one another for this purpose, namely in such a way that two blades 58 that are adjacent in the direction of rotation of the roller 22a, g are connected by means of a spring 60. An adjusting screw 62 on which an adjustment cone 64 is slidably mounted in the transverse direction Q runs along the axis of rotation A. The adjustment cone 64 presses from the inside and in the radial direction, i.e. perpendicular to the axis of rotation A, outward against the blades 58, which are mounted against an outer surface of the adjustment cone 64. This creates an adjusting mechanism in which, by turning the adjusting screw 62, the adjustment cone 64 is displaced in the transverse direction Q by the roller 22a, 22g and, depending on the direction of rotation of the adjusting screw 62, then drives the blades 58 further out of the roller 22a, 22g in the radial direction or allows them to retract through the springs 60 into the roller 22a, 22g, so that the cutting depth is adjustable as a result.

The rollers 22a, 22g shown here are each designed at the same time as a transverse draw roller and as a cutting roller, wherein the cutting tool 50 is then integrated into a transverse portion of the roller 22a, 22b which produces the transverse tensile stress F4. In this way, a transverse tensile stress F4 is automatically exerted during the relevant parting by means of the cutting tool 50, thereby reducing the formation of burrs and wrinkles during the parting operation. In combination with the outer surface M made of rubber, a design results in which the rubber is initially compressed when it comes into contact with the electrode sheet 4, thereby releasing the blades 58 of the cutting tool 50, which then part the electrode sheet 4 under optimal transverse tensile stress F4. This release of the knife when the outer surface is compressed is not explicitly shown in the merely schematic figures. The depth of cut and the thickness of the rubber are adapted here to the thickness d1, d2 of the carrier layer 6 and the electrode material 8. The roller 22b forms a counter roller for the roller 22a and one of the calender rollers 24 correspondingly forms a counter roller for the roller 22g, so that the relevant cutting tool 50 rolls over the relevant counter roller, whereby a wedge cutting is realized.

LIST OF REFERENCE SIGNS

2 Processing device
4 Electrode sheet
6 Carrier layer
8 Electrode material
10 Material region
12 Free region
14 Diverter
16 Electrode
18 Unwinder
20 Calender
22a-i Roller
24 Calender roller
26 Winder
28 Wrinkle
30 Partial sheet
32 Intermediate region
34 Knife, upper knife
36 Knife, lower knife
38 Sheet feed
40 Sheet take-up
42 Counter roller (of the sheet feed)
44 Counter roller (of the sheet take-up)
46 Inner portion
48 Outer portion
50 Cutting tool
52 Support roller
54 Transverse portion
56 Elevation or depression
58 Blade
60 Spring
62 Adjusting screw
64 Adjustment cone
66 Rib
68 Drive A. Axis of rotation
A1 Height or depth (of the elevation or depression)
A2 Width (of the elevation or depression)
A3 Length (of the elevation or depression)
B1 First processing stage
B2 Second processing stage
B3 Third processing stage
B4 Fourth processing stage
B5 Cleaning stage
d1 Thickness (of the carrier layer)
d2 Thickness (of the electrode material)
d3 Thickness (of the electrode sheet)
dF Longitudinal tension difference
F Conveying direction
F1 Sheet tension
F1' Longitudinal tensile stress
F2 Compressive stress
F3 Negative/positive elongation in the transverse direction
F4 Transverse tensile stress
F5 Longitudinal tensile stress (by roller)
M Outer surface
Q Transverse direction
W Engagement angle

The invention claimed is:

1. A method for processing an electrode sheet, wherein the electrode sheet has a carrier layer and an electrode material that is applied to the carrier layer only in a material region of the electrode sheet, so that a free region, which is free of electrode material, remains for the formation of diverters, the method comprising:
   guiding the electrode sheet in a conveying direction through a processing device so that the material region and the free region run side by side,
   wherein the processing device has a calender comprising at least two rollers through which the electrode sheet is guided and with which the material region is calendered,
   wherein the processing device additionally has at least one roller in addition to the at least two rollers of the calender that is designed in such a way that it exerts a transverse tensile stress on the electrode sheet,
   wherein the processing device has a first stage with said at least one roller, in which a cutting tool is integrated into said at least one roller for processing the carrier layer in such a way that the carrier layer is parted by means of the cutting tool,
   wherein the cutting tool is integrated into a transverse portion of the roller which produces the transverse tensile stress, such that the roller functions at the same time both as a transverse draw roller and as a cutting roller,
   wherein the roller is assigned a counter roller on the opposite side of the electrode sheet, and said counter roller then forms a roller pair with the roller, and
   wherein the counter roller is a calender roller of the calender, so that the cutting roller is arranged inside the calender and parts the electrode sheet inside the calender.

2. The method according to claim 1, wherein the at least one roller for exerting the transverse tensile stress has an outer surface that is wholly or partially made of a rubber.

3. The method according to claim 1, wherein the at least one roller for exerting the transverse tensile stress has a textured outer surface.

4. The method according to claim 1, wherein the at least one roller for exerting the transverse tensile stress is helical in shape.

5. The method according to claim 1,
wherein the calender produces a longitudinal tension difference between the free region and the material region in the conveying direction, and
wherein the at least one roller also exerts a longitudinal tensile stress in addition to the transverse tensile stress, so that the longitudinal tension difference is compensated.

6. The method according to claim 5, wherein the at least one roller has a drive for exerting the longitudinal tensile stress.

7. The method according to claim 1, wherein, by means of the cutting tool integrated into at least one of the at least one roller, the carrier layer is parted in the free region in such a way that recurring diverters are formed.

8. The method according to claim 1, wherein, by means of the cutting tool integrated into at least one of the at least one roller, the electrode sheet is parted in the material region and along the conveying direction in such a way that a plurality of partial sheets are formed which run side by side.

9. The method according to claim 1, wherein the processing device has a second processing stage with one of the at least one roller, which is designed in such a way that it engages the free region and therein exerts the transverse tensile stress and at the same time forms recurrent diverters in the free region.

10. The method according to claim 9,
wherein the processing device has a third processing stage, which has two calender rollers of the calender on opposite sides of the electrode sheet, for compressing the electrode material,
wherein the processing device has four rollers such that a relevant one of the two calender rollers in the transverse direction is bordered on both sides by two of the four rollers and with them has a common axis of rotation, and
wherein each of the four rollers acts only in a free region and exerts a transverse tensile stress there.

11. The method according to claim 10, wherein the processing device has a fourth processing stage, which follows the third processing stage, and which has two calender rollers of the calender on opposite sides of the electrode sheet for compressing the electrode material.

12. The method according to claim 1,
wherein the calender is designed in two stages and has three calender rollers, of which one calender roller serves as a counter roller for the other two calender rollers,
wherein the electrode sheet then goes through two processing stages in the calender for compression, so that the electrode material is compressed twice,
wherein the calender roller, which is a counter roller for the other calender rollers, also forms the counter roller for the cutting roller.

13. The method of claim 1,
wherein the cutting tool has a number of blades which are arranged along a common circumferential line about the roller and one behind the other in the direction of rotation, so that a straight cut is produced in the conveying direction,
wherein the cutting tool has an adjustable cutting depth in that the blades can be moved into or out of the roller, wherein the blades of the cutting tool are resiliently connected to one another for this purpose, namely in such a way that two blades which are adjacent in the direction of rotation of the roller are joined by means of a spring,
wherein an adjusting screw on which an adjustment cone is slidably mounted in the transverse direction runs along the axis of rotation and the adjustment cone presses from the inside and in the radial direction outward against the blades, which are mounted against an outer surface of the adjustment cone, such that by turning the adjusting screw, the adjustment cone is moved in the transverse direction through the roller and, depending on the direction of rotation of the adjusting screw, drives the blades further out of the roller in the radial direction or lets them retract into the roller by the springs.

* * * * *